US010852841B2

(12) United States Patent
Ryu et al.

(10) Patent No.: US 10,852,841 B2
(45) Date of Patent: Dec. 1, 2020

(54) METHOD OF PERFORMING FUNCTION OF DEVICE AND DEVICE FOR PERFORMING THE METHOD

(71) Applicant: SAMSUNG ELECTRONICS CO., LTD., Suwon-si (KR)

(72) Inventors: Jong-hyun Ryu, Daejeon (KR); Yong-gook Park, Yongin-si (KR); Han-joo Chae, Seoul (KR); Won-young Choi, Seoul (KR); Jeong-gwan Kang, Hwaseong-si (KR); Nam-hoon Kim, Suwon-si (KR); Hyun-su Hong, Seongnam-si (KR); Jin La, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/728,745

(22) Filed: Dec. 27, 2019

(65) Prior Publication Data
US 2020/0133400 A1 Apr. 30, 2020

Related U.S. Application Data

(63) Continuation of application No. 14/167,226, filed on Jan. 29, 2014, now Pat. No. 10,540,013.

(30) Foreign Application Priority Data

Jan. 29, 2013 (KR) .................. 10-2013-0010102
Jul. 17, 2013 (KR) .................. 10-2013-0084384

(51) Int. Cl.
G06F 3/01 (2006.01)
G06F 3/038 (2013.01)
(Continued)

(52) U.S. Cl.
CPC ............ *G06F 3/017* (2013.01); *G06F 1/1626* (2013.01); *G06F 1/1694* (2013.01); *G06F 3/038* (2013.01);
(Continued)

(58) Field of Classification Search
CPC ................ G06F 17/00; G06F 12/0842; G06F 2200/1637; G06F 3/017; G06F 3/0346
See application file for complete search history.

(56) References Cited

U.S. PATENT DOCUMENTS 8,392,735 B2   3/2013   Mucignat et al.
8,659,553 B1   2/2014   Chan
(Continued)

FOREIGN PATENT DOCUMENTS

CN   102713788 A   10/2012
CN   102810046 A   12/2012
(Continued)

OTHER PUBLICATIONS

Communication dated Dec. 1, 2017, issued by the State Intellectual Property Office of P.R. China in counterpart Chinese application No. 201410043726.3.
(Continued)

Primary Examiner — Gerald Johnson
(74) Attorney, Agent, or Firm — Sughrue Mion, PLLC

(57) ABSTRACT

A method of performing a function of a device based on motion information of the device in a standby mode of the device, a device for performing the method are provided. The device includes a sensor configured to detect movement of the device in a standby mode of the device; a storage configured to store motion information based on information related to the movement and at least one piece of function information corresponding to the motion information; and a processor configured to control the device to perform a
(Continued)

function corresponding to the motion information in the standby mode based on the information related to the movement, the motion information, and the at least one piece of function information.

15 Claims, 33 Drawing Sheets

(51) Int. Cl.
*G06F 3/0346* (2013.01)
*H04M 1/725* (2006.01)
*G06F 1/16* (2006.01)
*G06F 3/041* (2006.01)

(52) U.S. Cl.
CPC ............ *G06F 3/0346* (2013.01); *G06F 3/041* (2013.01); *H04M 1/72569* (2013.01); *G06F 3/013* (2013.01); *G06F 2200/1637* (2013.01); *H04M 2250/12* (2013.01)

(56) References Cited

U.S. PATENT DOCUMENTS

| | | |
|---|---|---|
| 8,761,840 B2 | 6/2014 | Dunko |
| 2008/0146289 A1 | 6/2008 | Korneluk et al. |
| 2009/0037849 A1 | 2/2009 | Immonen et al. |
| 2009/0259865 A1 | 10/2009 | Sheynblat et al. |
| 2010/0103102 A1 | 4/2010 | Shih et al. |
| 2010/0138766 A1 | 6/2010 | Nakajima |
| 2010/0214216 A1 | 8/2010 | Nasiri et al. |
| 2010/0235667 A1 | 9/2010 | Mucignat et al. |
| 2011/0093729 A1 | 4/2011 | Mucignat et al. |
| 2011/0304575 A1 | 12/2011 | Kim |
| 2011/0304648 A1 | 12/2011 | Kim et al. |
| 2012/0164971 A1 | 6/2012 | Choi |
| 2012/0229370 A1 | 9/2012 | Stroffolino |
| 2012/0235790 A1 | 9/2012 | Zhao |
| 2012/0270611 A1 | 10/2012 | Choi et al. |
| 2012/0306780 A1 | 12/2012 | Ohe |
| 2012/0316686 A1* | 12/2012 | Dueckman .............. B66C 13/40 700/275 |
| 2013/0207905 A1 | 8/2013 | Hankins |
| 2016/0209937 A1 | 7/2016 | Kutaragi |

FOREIGN PATENT DOCUMENTS

| | | |
|---|---|---|
| JP | 2007-304666 A | 11/2007 |
| JP | 2009-504000 A | 1/2009 |
| JP | 2013-510381 A | 3/2013 |
| JP | 2013-538472 A | 10/2013 |
| KR | 2001-0017203 A | 3/2001 |
| KR | 10-2011-0136587 A | 12/2011 |
| RU | 2007124188 A | 2/2009 |
| RU | 2414087 C2 | 1/2010 |
| RU | 2009101476 A | 7/2010 |
| WO | 2011/057287 A1 | 5/2011 |
| WO | 2011/156789 A1 | 12/2011 |
| WO | 2012/053795 A2 | 4/2012 |
| WO | 2012/060589 A3 | 5/2012 |

OTHER PUBLICATIONS

Communication dated Jan. 5, 2018, issued by the Japanese Patent Office in counterpart Japanese Application No. 2014-14143.
Communication dated Nov. 8, 2016, issued by the Federal Service for Intellectual Property in counterpart Russian Patent Application No. 2015136861.
Communication from the European Patent Office dated Feb. 25, 2016 in a counterpart European Application No. 14153011.3.
Communications dated May 23, 2014 issued by the International Searching Authority in counterpart International Application No. PCT/KR2014/000773 (PCT/ISA/210 & PCT/ISA/237).

* cited by examiner

FIG. 2

| OPERATION MODE OF DEVICE \ MOTION INFORMATION | 90° ROTATION IN CLOCKWISE DIRECTION | 180° ROTATION IN CLOCKWISE DIRECTION | 270° ROTATION IN CLOCKWISE DIRECTION |
|---|---|---|---|
| STANDBY MODE | PERFORM TIME CHECK FUNCTION | PERFORM QUICK NODE FUNCTION | PERFORM BYTE INFORMATION VIEWER FUNCTION |
| ACTIVE MODE | DURING WEB BROWSING, PERFORM BROWSER SECRET MODE | 1. DURING EXEUTION OF APPLICATION PERFORM QUICK SWITCHING<br>2. DURING LIST DISPLAY, PERFORM SORTING METHOD CHANGE FUNCTION | PERFORM VOICE RECORDER FUNCTION |

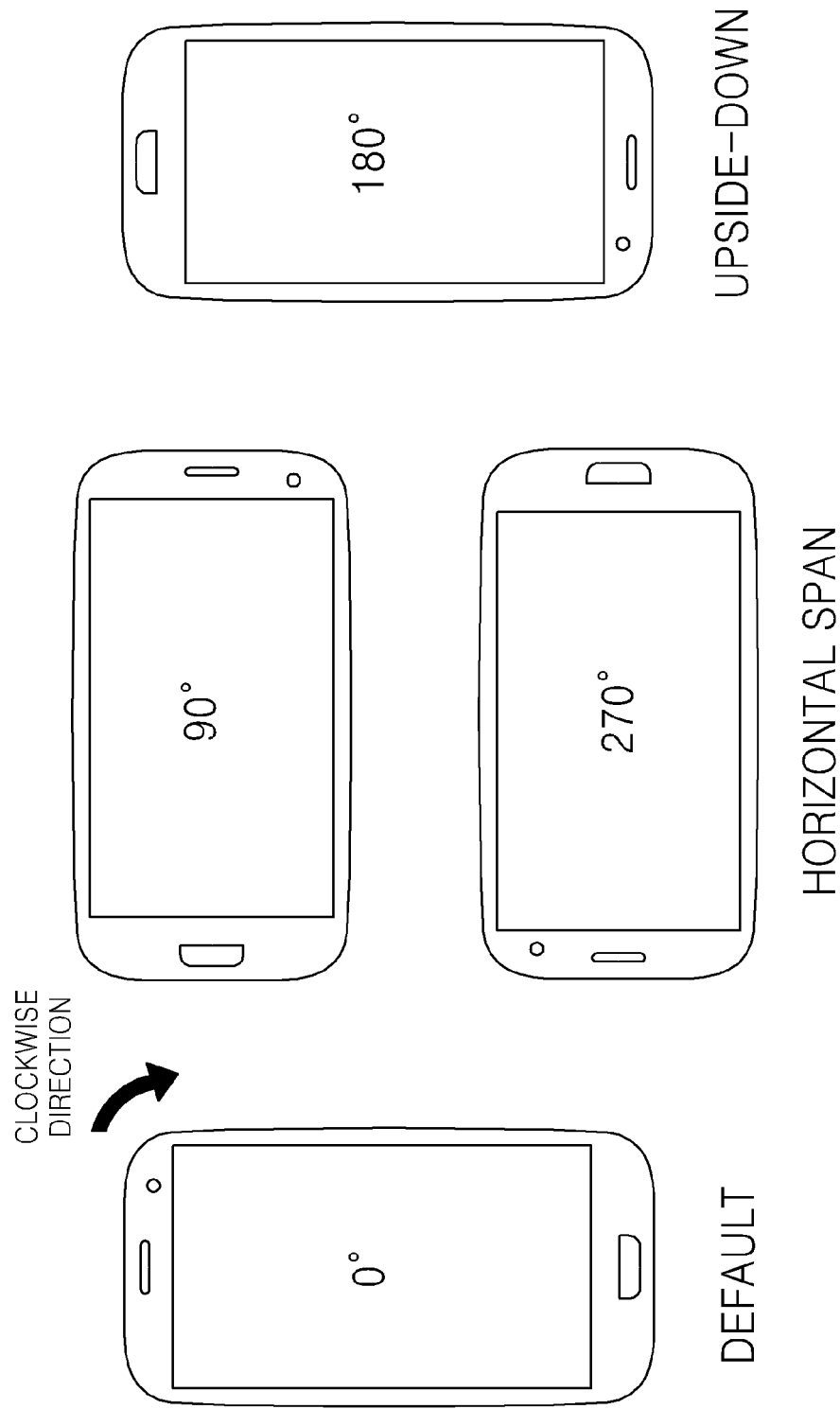

ASCENDING     DESCENDING

FIG. 4J
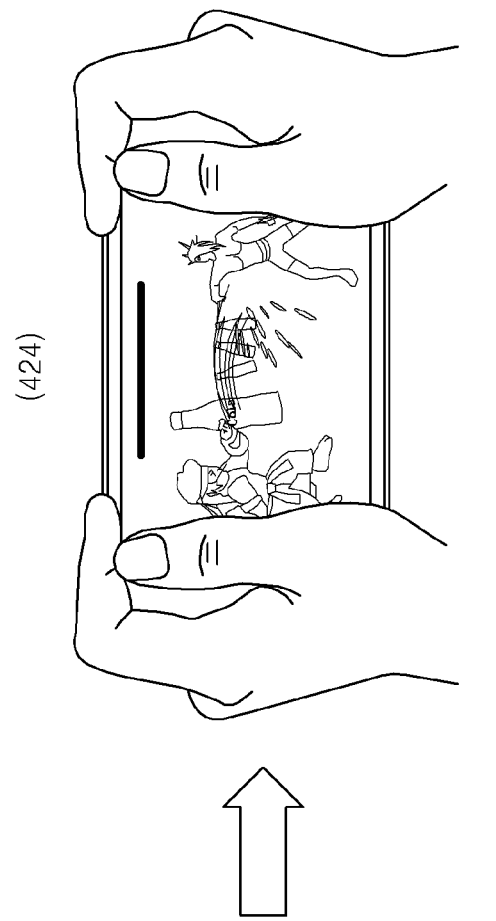
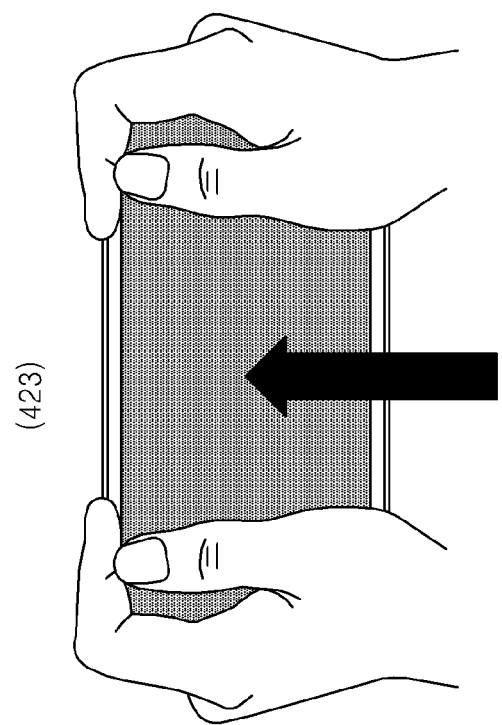

METHOD OF PERFORMING FUNCTION OF DEVICE AND DEVICE FOR PERFORMING THE METHOD

RELATED APPLICATIONS

This is a Continuation Application of U.S. patent application Ser. No. 14/167,226, filed on Jan. 29, 2014, which claims priority from Korean Patent Application No. 10-2013-0010102, filed on Jan. 29, 2013, and Korean Patent Application No. 10-2013-0084384, filed on Jul. 17, 2013, in the Korean Intellectual Property Office, the disclosures of which are incorporated herein in their entireties by reference.

BACKGROUND

1. Field

Apparatuses and methods consistent with exemplary embodiments relate to performing a function of a device, and more particularly to, a method of performing a function of a device based on a movement of the device and a device for performing the method.

2. Description of the Related Art

According to the functions of mobile devices such as smart phones have become more intelligent, mobile devices based applications, services, and contents are increasing and the functions of mobile devices are diversifying.

Accordingly, the accessibility to applications, services, and contents or the accessibility to functions that devices may perform may reduce. In particular, in a standby mode of a device, the accessibility to applications, services, and contents or the accessibility to functions that devices may perform may deteriorate.

SUMMARY

One or more exemplary embodiments provide a method of performing a function of a device based on motion information of the device in a standby mode of a device, a device for performing the method, and a non-transitory computer readable medium storing computer codes for performing the same.

One or more exemplary embodiments also provide a method of performing a function of a device based on motion information of the device and context information thereof in a standby mode of a device, a device for performing the method, and a non-transitory computer readable medium storing computer codes for performing the same.

One or more exemplary embodiments also provide a method of performing a function of a device based on an operation mode of a device and motion information thereof, a device for performing the method, and a non-transitory computer readable medium storing computer codes for performing the same.

One or more exemplary embodiments also provide a method of performing a function of a device based on an operating mode of a device, motion information thereof, and context information thereof, a device for performing the method, and a non-transitory computer readable medium storing computer codes for performing the same.

According to an aspect of an exemplary embodiment, there is provided a device including a sensor configured to detect movement of the device in a standby mode of the device; a storage configured to store motion information based on information related to the movement and at least one piece of function information corresponding to the motion information; and a processor configured to control the device to perform a function corresponding to the motion information in the standby mode based on the information related to the movement, the motion information, and the at least one piece of function information.

The standby mode of the device may include at least one of an idle state of an application processor included in the device, an inactive state of a function related to a touch screen included in the device, and a screen lock set state of the device.

The function related to the touch screen may include at least one of a touch sensing function of the touch screen and a display function of the touch screen.

The standby mode of the device may include an inactive state of other elements included in the device other than the movement sensor, the storage, and the processor, a state in which power is not consumed by the other elements, or a state in which power is consumed by the movement sensor, the storage, and the processor.

The processor may control the device such that a gateway screen is displayed before the function is performed.

The gateway screen may include notification information notifying that the function is performed, and selection information for selecting an execution mode of the function.

When there are a plurality of functions corresponding to the motion information of the device, the gateway screen may include selection information to select an execution mode of each of the plurality of functions.

The device may further include a context information sensor for detecting at least one piece of context information related to the device, wherein the storage stores mapping information between the at least one piece of context information, the motion information, and the at least one piece of function information, and the function performed by the processor is determined based on the at least one piece of context information detected by the context information sensor, information related to the movement of the device, and the mapping information.

The at least one piece of context information may include at least one piece of current time information, position information of the device, schedule information stored in the device, and log information related to the device.

According to an aspect of another exemplary embodiment, there is provided a method of performing a function of a device, the method including: detecting movement of the device in a standby mode of the device; detecting motion information based on information related to the movement; detecting at least one piece of function information corresponding to the detected motion information; and performing a function based on the detected at least one function information.

According to an aspect of another exemplary embodiment, there is provided a non-transitory computer readable recording medium storing one or more programs including commands for executing the method of performing the function of the device.

BRIEF DESCRIPTION OF THE DRAWINGS

The and/or other aspects will become apparent and more readily appreciated from the following description of exemplary embodiments, taken in conjunction with the accompanying drawings in which:

FIG. 2 shows a table for explaining mapping information regarding an operation mode of a device, motion information thereof, and function information thereof, according to an exemplary embodiment;

FIGS. 3A and 3B illustrate motion information of a device, according to an exemplary embodiment;

FIGS. 4A through 4J illustrate functions of a device performed based on motion information of the device and an operation mode of the device, according to exemplary embodiments;

DETAILED DESCRIPTION

Figure 1:
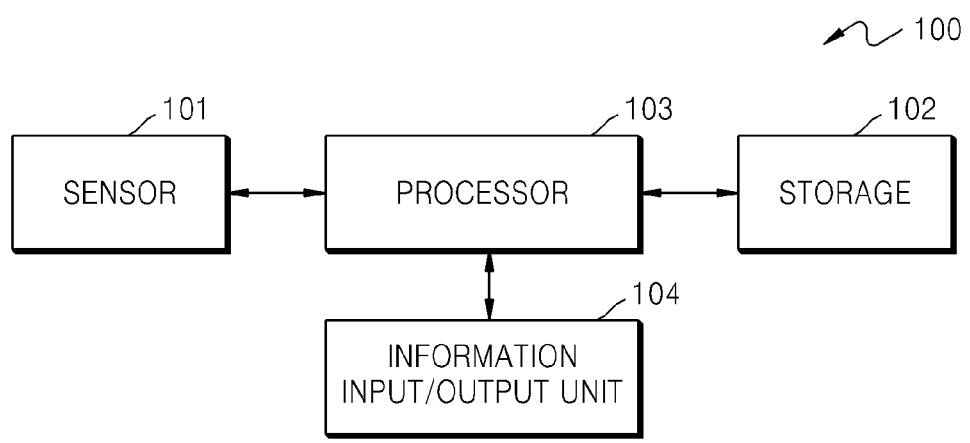
FIG. 1 is a block diagram of a device, according to an exemplary embodiment.

Reference will now be made in detail to embodiments, examples of which are illustrated in the accompanying drawings, wherein like reference numerals refer to like elements throughout. In this regard, the exemplary embodiments may have different forms and should not be construed as being limited to the descriptions set forth herein.

Terms such as "first" and "second" are used herein merely to describe a variety of constituent elements, but the constituent elements are not limited by these terms. These terms are used only for distinguishing one constituent element from another constituent element.

Most of the terms used herein are general terms that are widely used in the technical art to which the inventive concept pertains. However, some of the terms used herein may reflect intentions of technicians in this art, precedents, or the occurrence of new technologies. Also, some of the terms used herein may be arbitrarily chosen by the present applicant. In this case, these terms are defined in detail below. Accordingly, the specific terms used herein should be understood based on the unique meanings thereof and the whole context of the exemplary embodiments.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Throughout the specification, input information is touch based input information of a user. The touch based input information may include user gesture based input information. The touch based input information may include input information based on, for example, a tap (or a touch), a long tap (or a long touch), a touch and hold, a touch and drag, a double tap, dragging, panning, a flick, a drag and drop, a sweep, and the like, but is not limited thereto.

The input information is not limited to the touch based input information. For example, the input information may be movement based input information or vision based input information.

The movement based input information may be based on a user gesture (for example, a device shaking, a device rotation, a device pickup, etc.) based on a movement of a device. For example, the user gesture based on the device motion when a device is turned upside down in a direction of gravity, which will be described later, may be set as input information based on a movement of the device indicating a request to perform a preset function.

The vision based input information may be based on information recognized by analyzing an input image captured by a camera without contacting the device. For example, as will be described later, information obtained by recognizing a user's face included in the input image captured by the camera or information obtained by recognizing user's eyes may be set as the vision based input information indicating an activation request to a preset function of the device.

FIG. 1 is a block diagram of a device 100, according to an exemplary embodiment. The device 100 of FIG. 1 performs a preset function based on motion information regarding a movement of the device 100 and operation mode of the device 110.

Referring to FIG. 1, the device 100 includes a sensor 101, a storage 102, a processor 103, and an information input/output unit 104 but is not limited thereto. That is, the device 100 may include more or less constituent elements than those shown in FIG. 1.

For example, the device 100 may further include an element for detecting at least one piece of context information regarding the device 100. This will be described later with respect to FIG. 14. The device 100 may be configured to detect the at least one piece of context information regarding the device 100 by transmitting and receiving data between the element for detecting at least one piece of context information regarding the device 100, the processor 103, and the storage 102. The at least one piece of context information regarding the device 100 will be described in more detail with reference to FIG. 14. Information regarding the operation mode of the device 100 may be included in the at least one piece of context information regarding the device 100.

The sensor 101 may include a plurality of sensors of various types to sense movement of the device 100.

The information input/output unit 104 may include a display that may display a screen. The display may be configured as a touch screen and receive user touch based input information.

The operation mode of the device 100 may include a standby mode and an activation mode, but is not limited thereto.

The standby mode of the device 100 may include at least one of a black screen state of the device 100, an idle state of an application processor included in the device 100, a deactivation state of a function related to a touch screen of the information input/output unit 104, and a screen lock set state of the device 100. It is noted that the term "black screen state" is used throughout the present description to indicate a state of the screen in which no information is displayed the screen is thus blank and this is typically experienced by the user as a screen that is substantially black or grey in color: a "black screen state" is therefore not intended to limit the screen color to black alone.

The deactivation state of a function related to a touch screen may include a touch sensing function deactivation state of the touch screen and a display function deactivation state of the touch screen but is not limited thereto. The touch sensing function deactivation state of the touch screen may indicate an off state of a touch sensing function of the device 100. The display function deactivation state of the touch screen may indicate a black screen state of the device 100.

The standby mode of the device 100 may include a deactivation state of an element of the device 100 other than the sensor 101, the storage 102, and the processor 103. The standby mode of the device 100 may include a deactivation state of a function of the device 100 other than a function based on an interface between the sensor 101 and the storage 102 among functions of the processor 103, a function related to the sensor 101, and a function related to the storage 102.

The standby mode of the device 100 may include a low power state in which only the sensor 101, the storage 102, and the processor 103 operate. That is, the standby mode of the device 100 may include the low power state in which power is consumed by the sensor 101, the storage 102, and the processor 103. The low power state may be, for example, in the range of power consumption of several of mW and several μW but is not limited thereto.

The standby mode of the device 100 may include a low power state in which no power is consumed by an element of the device 100 other than the sensor 101, the storage 102, and the processor 103. The standby mode of the device 100 may include a state in which power consumption is less than that in an activation mode of the device 100.

The processor 103 may include an auxiliary processor which may perform a function based on an interface between the processor 103 and the sensor 101 and a function based on an interface between the processor 103 and the storage 102. In this case, the above-described low power state may refer to a state in which power is consumed by the sensor 101, the storage 102, and the processor 103. The auxiliary processor may use a micro controller unit that operates at a low clock rate.

The standby mode of the device 100 may include an activation state of the application processor included in the device 100. That is, when the screen lock set state of the device 100 is operated in the activation state of the application processor and is set as the standby mode of the device 100, the standby mode of the device 100 may include the activation state of the application processor.

The application processor may be included in the processor 103. This may mean that the processor 103 may include the application processor and the above-described auxiliary processor. When the processor 103 includes the application processor and the auxiliary processor, the above-described standby mode of the device 100 may include an activation state of the auxiliary processor included in the processor 103 and a deactivation state of the application processor but is not limited thereto.

The device 100 may be, for example, a smart phone, a smart TV, a personal computer (PC), a desktop PC, a notebook, a smart board, a tablet PC, a mobile device, a handheld device or a handheld PC, a media player, an e-book terminal, a personal digital assistant (PDA), a digital camera having a function of sensing a movement of the device, and a digital consumer electronics (CE) device having a function of sensing a movement of the device, but is not limited thereto.

For example, the device 100 may be equipment that a user may put on. The equipment may be, for example, equipment used as a watch, glasses, a binding accessory (for example, a waist belt, a hair band, etc.), diverse types of wearable accessories (for example, a ring, a bracelet, an ankle bracelet, a hair pin, a necklace, etc.), earphones, a helmet, various types of body guards (for example, knee guards and elbow guards), shoes, gloves, clothes, a hat, a prosthesis leg for an impaired person, a prosthesis hand for an impaired person, etc. The equipment that the user may wear may have a communication function and a data processing function. The equipment that the user may wear is not limited to the equipment described above.

The sensor 101 detects movement of the device 100. The movement of the device 100 may include, for example, a rotation based movement such as an upside-down movement of the device 100, a rotation direction based movement (for example, a clockwise direction movement, a counter clockwise direction movement, a +z axial direction movement, and a −z axial direction movement, a perpendicular direction based movement such as that the device 100 is placed in a horizontal direction and then is lifting in a vertical direction, and a movement distance of the device 100 according to the perpendicular direction based movement, but is not limited thereto. For example, the movement of the device 100 may include a shaking based movement of the device 100 as described above.

The sensor 101 includes at least one sensor for detecting the movement of the device 100. That is, the sensor 101 may include at least one of a gyro sensor for sensing a rotation based movement of the device 100 and an accelerometer sensor for sensing a perpendicular direction based movement of the device 100 and a moving distance of the device 100, but is not limited thereto.

For example, the sensor 101 may further include at least one of a magnetic field sensor for sensing a rotation direction of the device 100, an orientation sensor for sensing an inclination direction of the device 100, a global position system (GPS) sensor for sensing a location of the device 100, a gravity sensor for sensing a gravity direction of the device 100, and a rotation number sensor for sensing a rotation number of the device 100. Sensors that may be further included in the sensor 101 are not also limited to those described above.

The gyro sensor may include three gyro sensors for sensing a rotation angular speed around three axes (x, y, and z axes) of the device 100. In this case, the sensor 101 may convert results of sensing an x axis rotation angle (roll (left and right rotation) angle) of the device 100, a y axis rotation angle (pitch (gradient) angle), and a z axis rotation angle (yaw (horizontal rotation) angle) and the rotation direction into electrical signals and output the electrical signals.

An acceleration sensor may be configured to sense an acceleration variation with respect to the three axes (x, y, and z axes) of the device 100 or an acceleration variation with respect to the two axes (x and y axes). In this case, the sensor 101 may convert results of sensing a linear acceleration of the device 100 and an inclination angle of each axial direction into electrical signals and output the electrical signals. The electrical signals output by the sensor 101 are transmitted to the processor 103.

The sensor 101 may be referred to as a movement sensor for detecting the movement of the device 100. The electrical signals output by the sensor 101 may be referred to as a sensing value of the movement of the device 100 or information regarding the movement of the device 100.

The storage 102 stores at least one program and data related to the at least one program. The at least one program stored in the storage 102 includes a program used to control a device so as to perform a function based on motion information of the device 100 based on the information regarding the movement of the device 100 and at least one piece of function information of the device 100 corresponding to the motion information. The data related to the at least one program may include mapping information of the above-described information regarding the movement of the device 100, the above-described motion information of the device 100, and the above-described function information of the device 100.

FIG. 2 shows a table for explaining mapping information regarding operation mode information of the device 100, motion information thereof, and function information thereof, according to an exemplary embodiment. The table of FIG. 2 does not include information indicating a mapping relationship between information regarding a movement of the device 100 and the motion information thereof. However, motion information of the device 100 such as a 90° rotation in a clockwise direction, a 180° rotation in the clockwise direction, and a 270° rotation in the clockwise direction may be determined based on the information regarding the movement of the device 100 that is output by the sensor 101.

Data related to a program stored in the storage 102 may include table information shown in FIG. 2. The data related to the program stored in the storage 102 does not include information related to an activation mode of the device 100 and may include the mapping information regarding the movement information of the device 100, the motion information thereof, and the function information thereof related to a standby mode of the device 100.

Referring to FIG. 2, the operation mode of the device 100 may include the standby mode and the activation mode. The motion information of the device 100 may include information indicating a 90° rotation in a clockwise direction, information indication a 180° rotation in the clockwise direction, and information indicating a 270° rotation in the clockwise direction.

The above-described standby mode may be referred to as a sleep mode, a deactivation mode, or an idle state but is not limited thereto. An active mode may be referred to as a running mode but is not limited thereto.

Figure 3B:
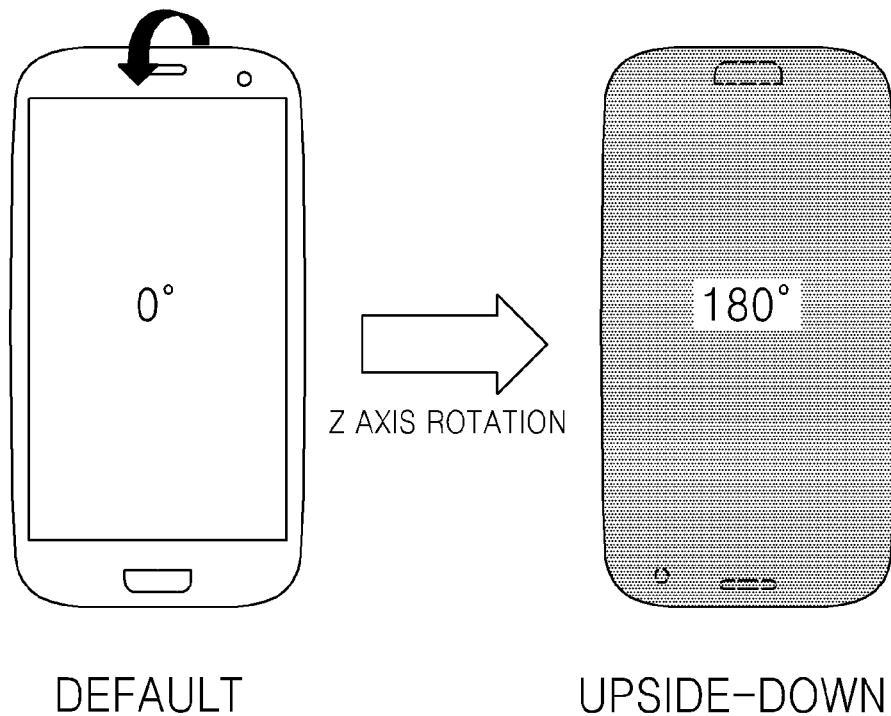

FIGS. 3A and 3B show screens for explaining rotation based motion information of the device 100, according to an exemplary embodiment. That is, FIG. 3A is an example of a plurality of pieces of motion information with respect to the device 100 in a vertical position. The motion information includes horizontal span motion information of a 90° rotation in a clockwise direction, horizontal span motion information of a 270° rotation in the clockwise direction, and upside-down motion information of a 180° rotation in the clockwise direction.

The rotation based motion information of the device 100 is not limited to the 90°, 180°, and 270° rotations as shown in FIG. 3A. For example, the rotation based motion information of the device 100 may be set based on information regarding a rotation movement below 90° in the clockwise direction. That is, the rotation based motion information of the device 100 may be set based on information regarding a rotation movement by 45° in the clockwise direction.

The rotation based motion information of the device 100 may include motion information based on information regarding a movement according to a rotation of the device 100 by 90° in a counterclockwise direction. The rotation based motion information of the device 100 may include motion information based on information regarding a movement according to a rotation of the device 100 by 90° in the clockwise direction and the motion information based on the information regarding the movement according to the rotation of the device 100 by 90° in the counterclockwise direction.

The rotation based motion information of the device 100 may include one of motion information based on information regarding an upside-down movement (180° rotation) in a +z axis direction and motion information based on information regarding the upside-down movement (180° rotation) in a −z axis direction with respect to the device 100 in the vertical position as shown in FIG. 3B. The rotation based motion information of the device 100 may include motion information based on information regarding the upside-down movement (180° rotation) in the ±z axis direction with respect to the device 100 in the horizontal position.

A standby mode of the device 100 may be changed to an active mode according to motion information detected in the standby mode of the device 100.

The information input/output unit 104 may be in a deactivation state in the standby mode of the device 100. For example, when a touch screen is included in the information input/output unit 104, and the standby mode of the device 100 is set as a black screen of the touch screen, a deactivation state of a function related to the touch screen, or a screen lock set state of the device 100, the information input/output unit 104 may be in the deactivation state in the standby mode of the device 100.

The active mode of FIG. 2 may include an active state of all the sensor 101, the storage 102, the processor 103, and the information input/output unit 104 that are included in the device 100. The active mode of FIG. 2 may include an active state of at least one other element that is not shown as well as the sensor 101, the storage 102, the processor 103, and the information input/output unit 104 that are included in the device 100.

The active mode of FIG. 2 may include a power consumption state in which power is consumed by the sensor 101, the storage 102, the processor 103, and the information input/output unit 104 that are included in the device 100. The active mode of FIG. 2 may include the power consumption state in which power is consumed by at least one other element that is not shown as well as the sensor 101, the storage 102, the processor 103, and the information input/output unit 104 that are included in the device 100.

The active mode of FIG. 2 may include an active state of an application processor included in the device 100. The active state of the application processor may indicate a state in which power is consumed by the application processor.

The active mode of FIG. 2 may include a state in which power consumption of the device 100 is greater than that in the standby mode of FIG. 2.

The active mode of FIG. 2 may include a state in which at least one of an application, a service, and content that may be set in the device 100 or may be downloaded by the device 100 from the outside is executed or an execution of at least one of the application, the service, and the content may be requested.

The state in which at least one of the application, the service, and the content is executed may include a multitasking state. The state in which an execution of at least one of the application, the service, and the content may be requested may include a state in which the information input/output unit 104 displays or may display a screen including an icon, a screenshot, or a user interface that may be used to set an execution mode of the application, the service, and the content.

A relationship between the operation mode information of the device 100, the motion information of the device 100, and the function information of the device 100 will now be described in more detail with reference to FIG. 2.

That is, when the motion information of the device 100 corresponds to information regarding a movement indicating the 90° rotation in the clockwise direction, and the operation mode of the device 100 is the standby mode, a preset function that may be performed by the device 100 is a time check function.

FIGS. 4A through 4J show screens 401 through 424 for explaining preset functions of the device 100 performed based on motion information of the device 100 and an operation mode of the device 100, according to exemplary embodiments.

Figure 4A:
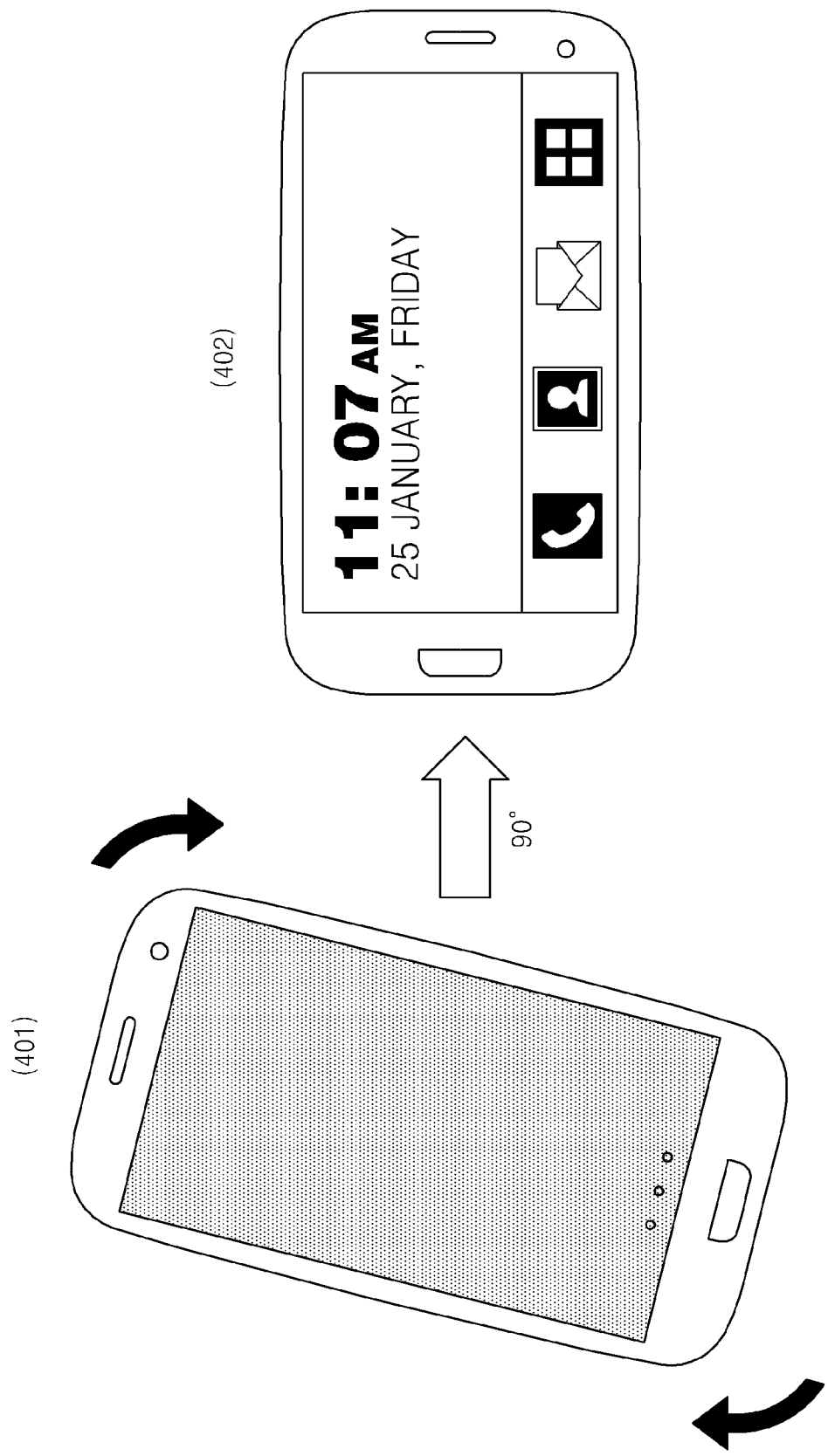

Referring to FIG. 4A, when the device 100 is in a standby mode, the information input/output 104 displays the black screen 401, and a sensing value (information regarding a movement) indicating a 90° rotation of the device 100 in a clockwise direction is received from the sensor 101, the processor 103 detects the motion information of the device 100 from information stored in the storage 102 according to the received sensing value. In this regard, the detected motion information indicates the 90° rotation in the clockwise direction.

The processor 103 detects function information from the storage 102 by using the motion information of the device 100 detected in the standby mode of the device 100. The detecting of the function information or the motion information from the storage 102 may be referred to as reading of information or searching of information but is not limited thereto.

Referring to FIG. 2, when the motion information of the device 100 indicates the 90° rotation of the device 100 in the clockwise direction, and the operation mode of device 100 is in the standby mode, the function information detected from the storage 102 is time check function information. The processor 103 controls a function of the device 100 to perform a time check function according to the detected function information. Accordingly, the black screen 401 of the information input/output unit 104 is changed to a screen 402 including time information.

The screen 402 provided by performing the time check function may be referred to as a first screen. The first screen may be a screen firstly provided on the black screen 401 but is not limited thereto. For example, the first screen may be the screen firstly provided on the black screen 401 as well as a screen that may provide various types of information such that a user may stay more than a preset time. Various types of information may include, for example, information related to a gateway that will be described later but is not limited thereto.

When the first screen is provided, an application processor included in the device 100 may be in a deactivation state but may be in an active state. It may be determined whether the application processor included in the device is in a deactivation state according to information provided on the first screen. For example, when the information provided on the first screen is provided in the deactivation state of the application processor included in the device 100, the application processor may be in the deactivation state. When the information provided on the first screen is provided in the active state of the application processor included in the device 100, the application processor may be in the active state.

When the screen 402 including the above-described time function is displayed, the application processor included in the device 100 may be in the deactivation state. The application processor may be included in the processor 103 and set in the deactivation state or the active state as described above. However, the application processor may be installed outside the processor 103.

Figure 4B:
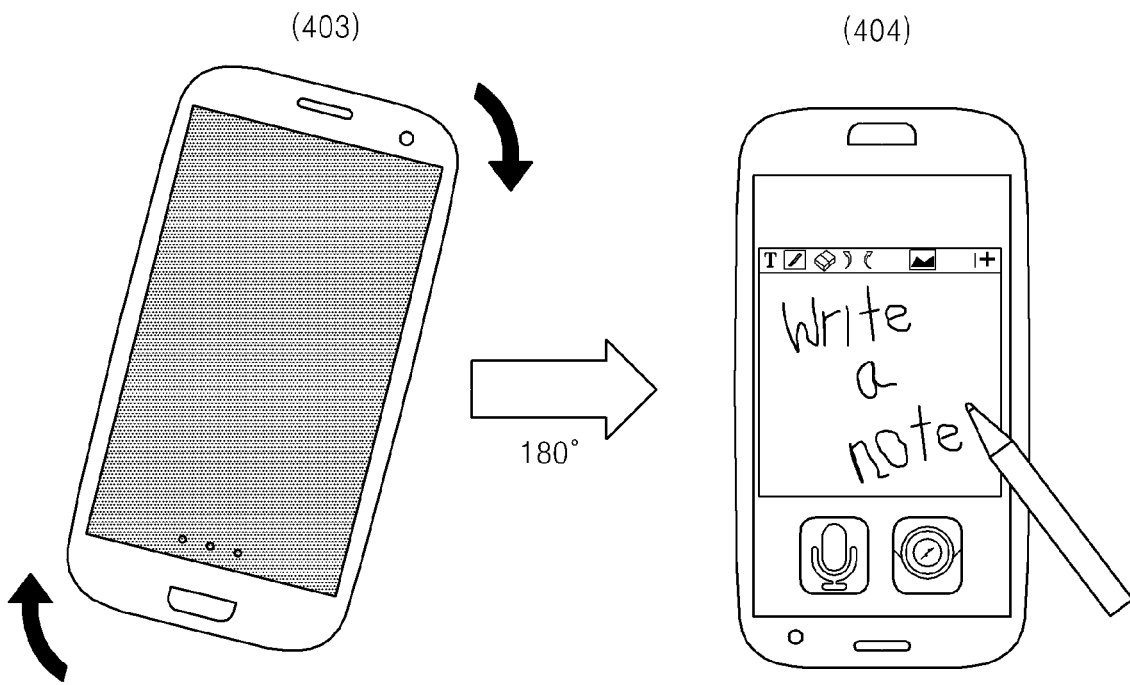

When the device 100 is the standby mode and the motion information of the device 100 indicates a 180° rotation in the clockwise direction in FIG. 2, a quick node function, as shown in FIG. 4B, may be a preset function that may be performed by the device 100.

Referring to FIG. 4B, when the device 100 is in the standby mode, the information input/output unit 104 displays a black screen 403, a sensing value indicating the 180° rotation of the device 100 in the clockwise direction is received from the sensor 101, the processor 103 recognizes the motion information of the device 100 as the 180° rotation in the clockwise direction. The recognizing of the motion information by the processor 103 according to the sensing value may be based on an operation of detecting the motion information from the storage 102 by using the received sensing value. Thus, the recognizing of the motion information by the processor 103 may be referred to as detecting of the motion information but is not limited thereto.

The processor 103 may detect an operation mode of the device 100 after detecting the motion information of the device 100. The processor 103 may detect information regarding the preset function corresponding to the detected motion information of the device 100 and the detected operation mode of the device 100 from the storage 103.

When the device 100 is in the standby mode and the motion information of the device 100 is detected as the 180° rotation in the clockwise direction in FIG. 2, the information regarding the preset function read from the storage 103 is quick node function information. Accordingly, the processor 103 may perform the quick note function, and a screen displayed on the information input/output unit 104 may be changed from the black screen 403 to a note screen 404 as shown in FIG. 4B.

A recording icon and a camera icon that are included in the note screen 404 of FIG. 4B may be used for the quick note function. That is, when a user command to select the recording icon is input in the note screen 404, content that is recording may be displayed on the note screen 404. For example, if a user voice signal "I am going to school at 8 a.m." is input, the processor 103 converts the input user voice signal into text information and displays the converted text information on the note screen 404. Accordingly, the user may see a message "I am going to school at 8 a.m." on the note screen.

To this end, the processor 103 may perform a function of converting an audio signal received through the information input/output unit 104 into text information that may be displayed. In this regard, a font of the text information that may be displayed may be previously set. The displayed text information may be stored in the storage 102 according to a user storage request.

Therefore, desired content may be written on the note screen 404 by using a stylus pen or by using a recording function. Accordingly, the user may quickly write ideas that instantly occur, and may use the quick note function of the device 100 without the stylus pen.

When the stylus pen is installed in the device 100, the quick note function of the device 100 may be used without removing the stylus pen. When the recording icon is selected, the processor 103 may display a screen for executing a recording application on the information input/output unit 104 while executing the recording application.

When a command to select the camera icon is input on the note screen 404, a camera may be used to display a captured image on a quick note screen. To this end, the processor 103 may perform a function of overlapping the image captured by the camera on the quick note screen.

For example, the processor 103 may split and display a screen according to an execution of a camera application and the quick note screen. For example, a message related to the captured image may be input on the note screen 404 by displaying the image captured by the camera in the left side and the note screen in the right side. An area on which that captured image is displayed and an area on which the note screen 404 is displayed are not limited thereto. The captured image may be a still image or a moving image.

Sizes of the screen on which the captured image is displayed and the quick note screen may be previously set. Only an image captured according to a user command or both the captured image and the message input on the note screen 404 may be stored in the storage 102. Accordingly, the user may capture and store an image that the user wants to capture quickly by using the quick note function or may store both the captured image and a message related to the captured image.

When the captured image is stored, the execution of the camera application may automatically end or may end according to a user request. Such an operation follows an environment set of the device 100. The information input/output unit 104 may further include a microphone and a camera for the above-described recording function and capture function.

When a corresponding application is executed by using the recording icon and the camera icon that are included in the above-described note screen 404, the note screen 404 may be defined as a gateway screen to execute the recording application or a camera application.

The gateway screen may include notification information notifying that a preset function will be executed. The gateway screen may include selection information used to select an execution mode regarding at least one function. The selection information may be defined like the above-described recording icon and camera icon. The gateway screen will be described in more detail with reference to FIGS. 17 and 18A through 18F later.

When the quick note function indicates a function of quickly performing a note application installed in the device 100, the quick note function may be based on the note application installed in the device 100.

The quick note function may simultaneously select the recording icon and the camera icon. In this case, the captured image and the text information of the audio signal corresponding to the captured image may be displayed on the note screen 404. The simultaneously selecting of the recording icon and the camera icon may be performed by using a multi-touch on the recording icon and the camera icon. The simultaneously selecting of the recording icon and the camera icon may follow the environment set of the device 100 that the camera icon is automatically selected since the recording icon is selected. The simultaneously selecting of the recording icon and the camera icon may follow the environment set of the device 100 that the recording icon is automatically selected since the camera icon is selected.

Figure 4C:
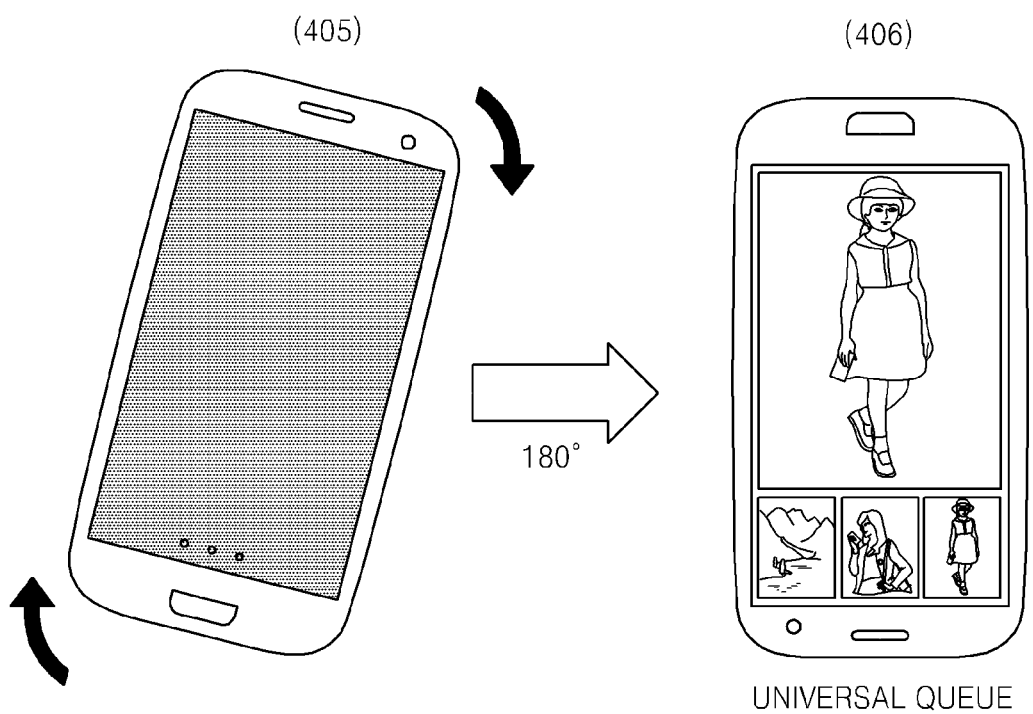

When the device 100 is in the standby mode and the motion information based on the information regarding the movement of the device 100 indicates the 180° rotation in the clockwise direction, as shown in FIG. 4C, a universal queue function may be a preset function that may be performed by the device 100.

FIG. 4C shows the universal queue function when the device 100 is in the standby mode, the information input/output unit 104 displays a black screen 405, and the motion information based on the information regarding the movement of the device 100 indicates the 180° rotation in the clockwise direction.

That is, information regarding the preset function that is read by the processor 103 from the storage 102 is universal queue function information. The processor 103 controls the device 100 to convert the black screen 405 displayed on the information input/output unit 104 into an information screen 406 stored in a universal queue. The universal queue may be included in the storage 102.

When the device 100 is in the standby mode and the motion information of the device 100 indicates the 180° rotation in the clockwise direction, a universal queue list display function is a preset function that may be performed by the device 100.

Figure 4D:
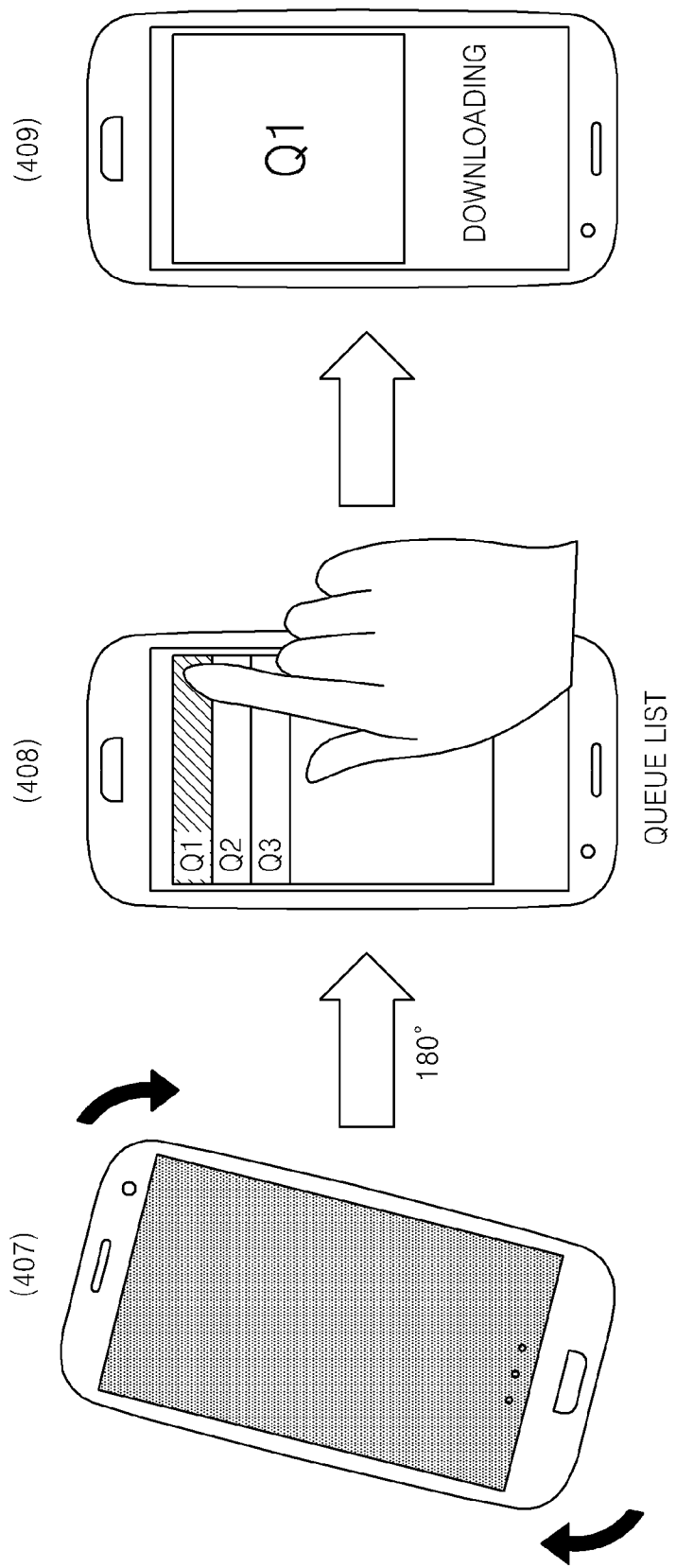

When the information regarding the preset function is universal queue list display function information, since the processor 103 performs the universal queue list display function, as shown in FIG. 4D, the black screen 407 displayed on the information input/output unit 104 is converted into a universal queue list screen 408. A universal queue list may be stored in the storage 103, and information based on the universal queue list may be provided from the storage 103 or a server (not shown). The screen 409 of FIG. 4D is a screen for downloading information regarding a universal queue selected based on the universal queue list from the server (not shown).

When the device 100 is in the standby mode and the motion information of the device 100 indicates the 270° rotation in the clockwise direction in FIG. 2, a byte information viewer function is a preset function that may be performed by the device 100.

The byte information viewer function is a function of showing necessary information according to a screen or an environment set in the device 100. For example, ticket information, security card information, payment barcode information, coupon information, etc. that are previously designated by the user are information that may be provided by using the byte information viewer function but are not limited thereto.

The user may quickly swipe and view information that remains in a clipboard, information that remains as a byte information viewer through a specific interaction, and information stored in a screen capture and a note while using a specific application by using the byte information viewer function.

Figure 4E:
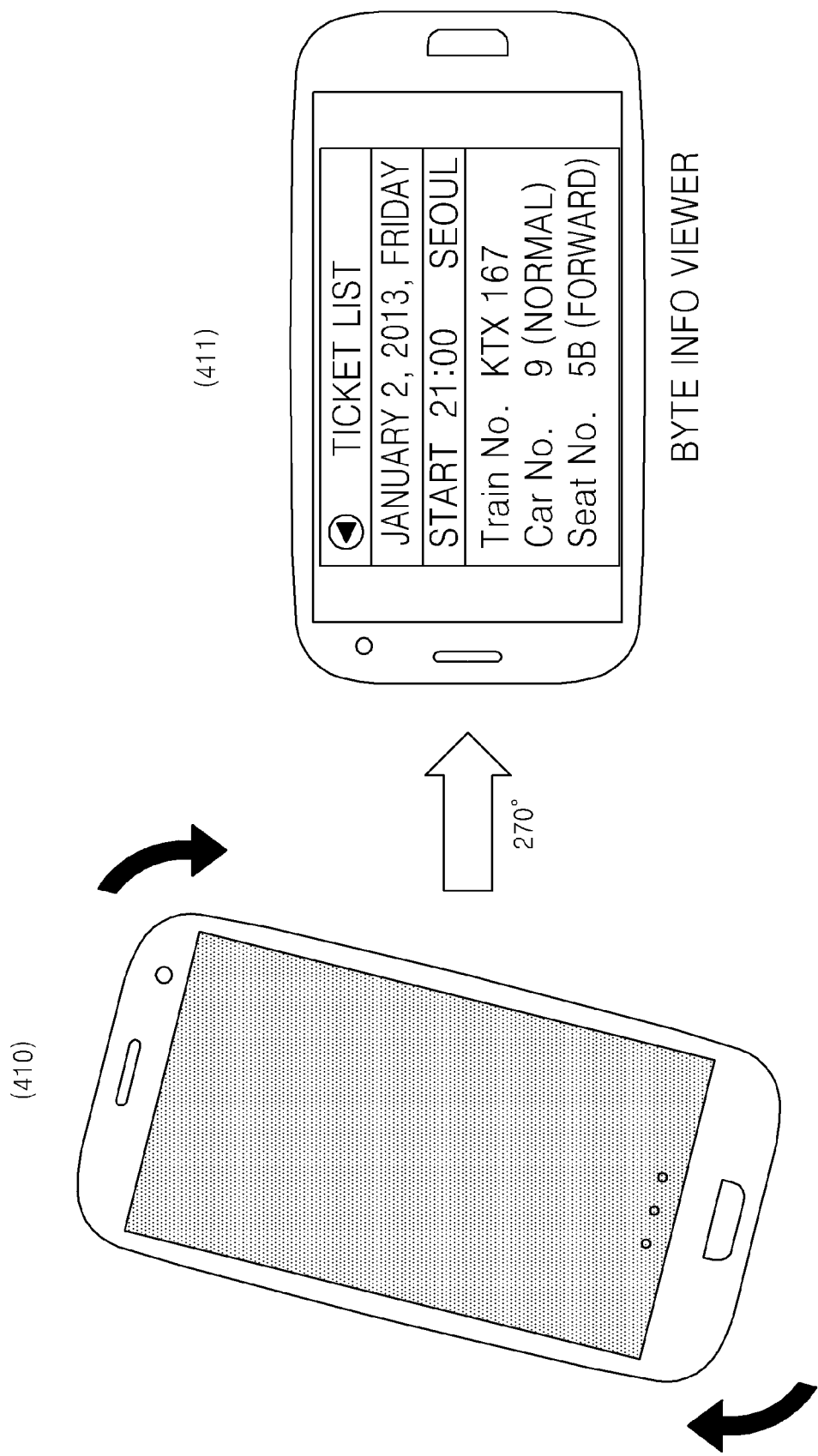

FIG. 4E shows a screen for executing the byte information viewer function. That is, when the device 100 is in the standby mode, the information input/output unit 104 displays a black screen 410, and a sensing value indicating the 270° rotation of the device 100 in the clockwise direction is received from the sensor 101, the processor 103 recognizes the motion information of the device 100 based on the operation mode of the device 100, a screen state of an information input/out unit 104, and the sensing value.

When the motion information is recognized, the processor 103 detects the information regarding the preset function from the storage 102 by using the operation mode of the device 100 and the motion information of the device 100. Referring to FIG. 2, the information regarding the preset function detected from the storage 102 is byte information viewer function information. The processor 103 performs the byte information viewer function, and the black screen 410 of the information input/output unit 104 is converted into a previously set information screen 411.

Figure 4F:
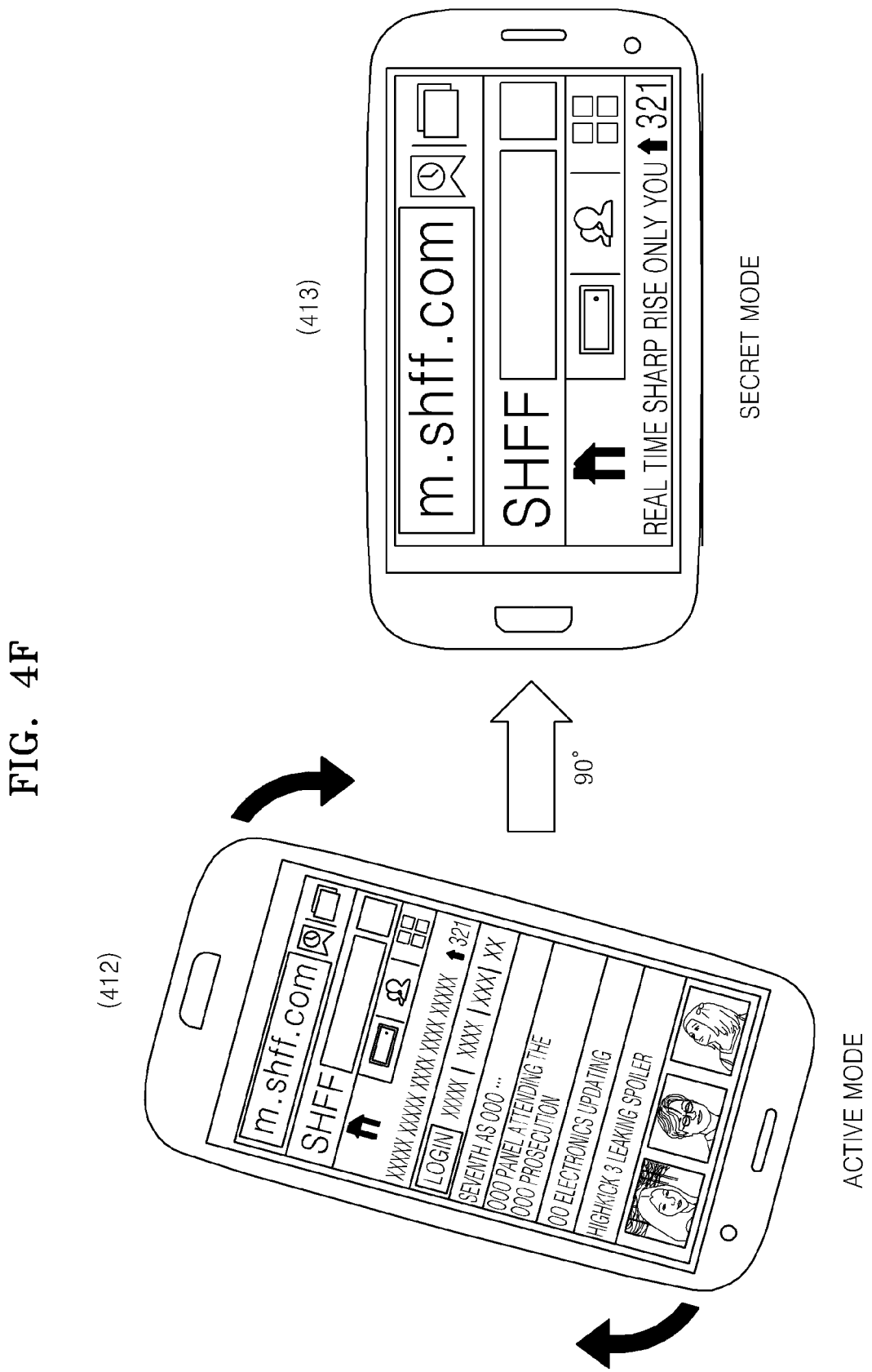

Referring to FIG. 2, when the device 100 is in an active mode, the motion information of the device 100 indicates the 90° rotation in the clockwise direction, and a function currently performed by the device 100 is a web browsing function, as shown in FIG. 4F, a browser secret mode execution function is a preset function that may be performed by the device 100.

Referring to FIG. 4F, when the device 100 in the active mode executes the web browsing function 412, and the motion information indicating the 90° rotation of the device 100 in the clockwise direction is detected based on the sensing value received from the sensor 101, the processor 103 detects the information regarding the preset function from the storage 102 by using the motion information of the device 100, the operation mode of the device 100, and the function executed by the device 100. The information regarding the preset function is browser secret mode execution function information. Accordingly, the processor 103 executes a browser secret mode, also known as an "incognito" or "private" browsing mode. Once the browser secret mode is executed, log information that occurs after the execution of the browser secret mode, is not recorded on the device 100. The log information may include information such as a user's searching history information, a user's internet surfing history information, and log-in information, etc.

During the execution of the browser secret mode, when a sensing value indicating a 90° rotation of the device 100 in a counterclockwise direction is received from the sensor 101 (that is, the sensing value is received as a reference value), the processor 103 may cancel the execution of the browser secret mode of web browsing. A browser secret mode execution function and a browser secret mode cancellation function may be performed by the processor 103 by reading the motion information from the storage 102 by using the sensing value, and reading the information regarding the preset function from the storage 102 by using the read motion information and the sensing value.

Figure 4G:
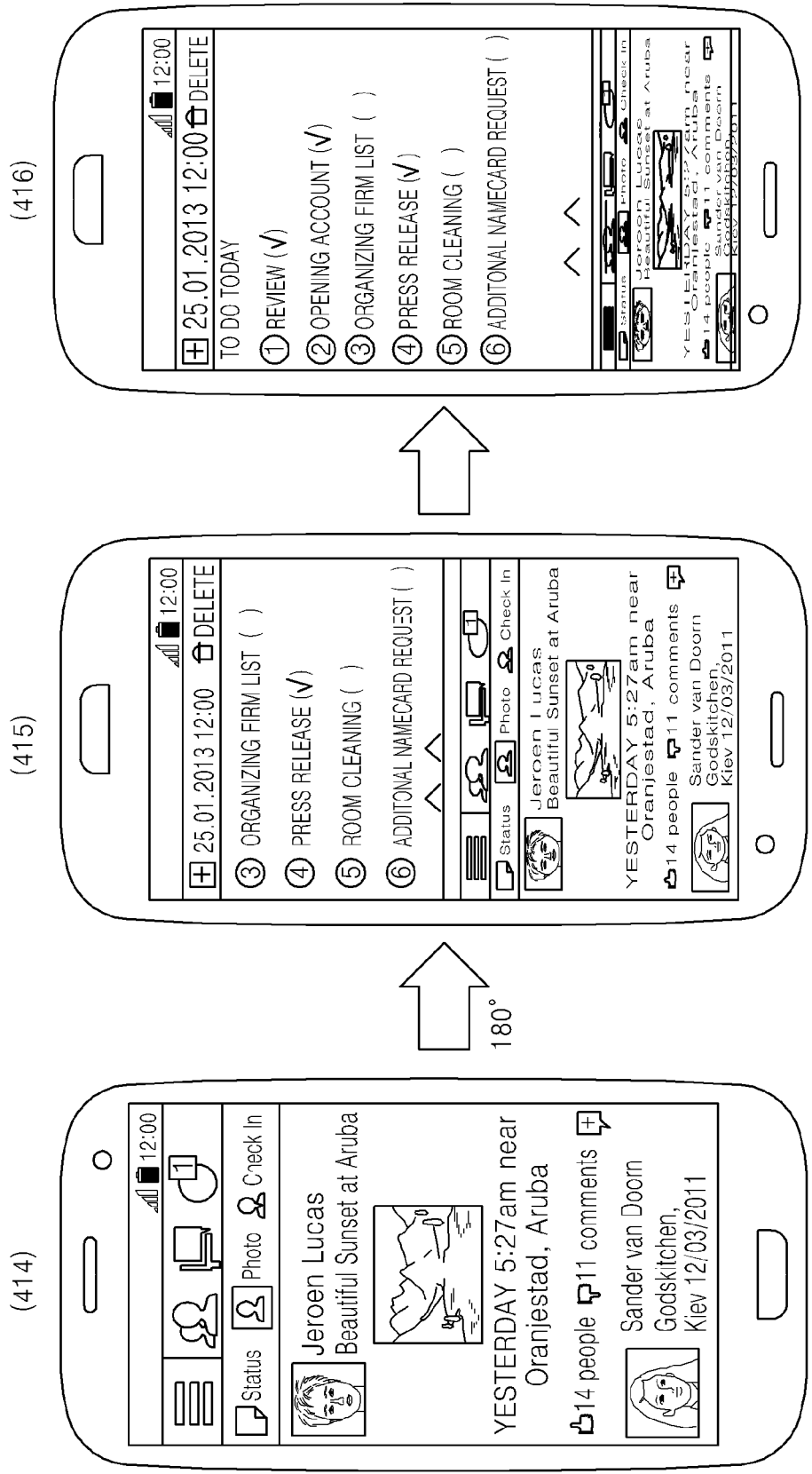

Referring to FIG. 2, when the device 100 is in the active mode, the motion information of the device 100 indicates the 180° rotation in the clockwise direction, and an application is currently executed by the device 100, as shown in FIG. 4G, a function of switching the application to another application is a preset function that may be performed by the device 100.

Referring to FIG. 4G, while the device 100 executes a specific social network service (SNS) 414, when a sensing value indicating the 180° rotation of the device 100 in the clockwise direction is received from the sensor 101, the processor 103 detects the motion information of the device 100 from the storage 102 by using the sensing value. The processor 103 detects the information regarding the preset function from the storage 102 by using the detected motion information of the device 100 and the operation mode of the device 100. In FIG. 4G, the detected motion information of the device 100 is the function of switching the application to another application.

Thus, the processor 103 performs the function of switching the application to another application 415, 416. The above-described other application may include one of a previously set application, an application that was just previously executed, and another application that is multitasking but is not limited thereto. If a plurality of applications are performed at the same time, the other application may include an application that has been recently executed.

When applications are switched, although the processor 103 may directly switch screens, an animation effect may be provided as shown by the screens 415 and 416 of FIG. 4G. If the screens 415 and 416 of FIG. 4G display a heavy stone in a low side of the device 100 as an accordion effect, and the sensing value indicating the 180° rotation of the device 100 in the clockwise direction is received from the sensor 101, the processor 103 displays a screen of slowly compressing an original application screen while slowly lowering the heavy stone down.

The animation effect is not limited to the above-described accordion effect. For example, the animation effect may include various animation effects such as an animation effect of making a blurry image clear, an animation effect of moving an image from top to bottom of a screen, an animation effect of rotating an image at the same angle as the rotation angle of the device 100, etc. Various animation effects may be set by the user in advance. The animation effect may be simulated in a demonstration form in advance before set by the user.

Figure 4H:
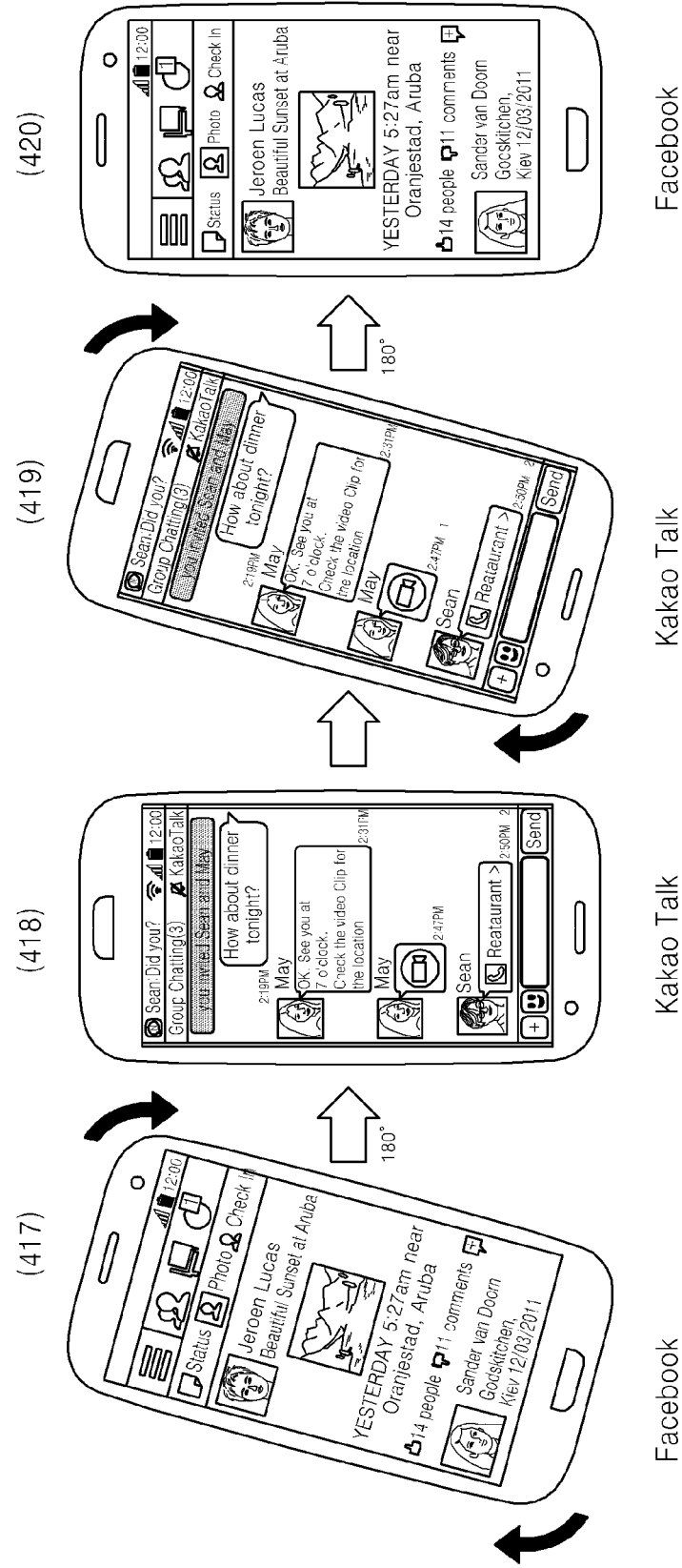

Referring to FIG. 4H, while the device 100 executes a specific application (for example, Facebook) 417, when it is sensed that the device 100 rotated by 180° in the clockwise direction, the application (for example, Facebook) is switched to a previously designated application (for example, KaKao Talk) 418. During an execution of the designated application (for example, KaKao Talk), when the device 100 rotates by 180° in the clockwise direction again 419, the executed application (for example, Kakao Talk) is switched to a previously executed application (for example, Facebook) 420. As described above, the motion information of the device 100 stored in the storage 102, information regarding the operation mode of the device 100, and the information regarding the preset function that may be performed by the device 100 may be set in such a way that an application executed by the device 100 may be switched to another application. The device 100 may be set to rotate by 180° in the counterclockwise direction on the screen 419.

When the operation mode of the device 100 indicates an execution of a service or content, information regarding a preset function of the device 100 according to a preset motion information may be set to switch the service or the content to another service, other content, or another application.

When the operation mode of the device 100 indicates a service or an application, and a plurality of accounts are set in a currently executed service or application, information regarding a preset function of the device 100 according to preset motion information may be set to perform a function of changing a currently used account to another account.

Figure 4I:
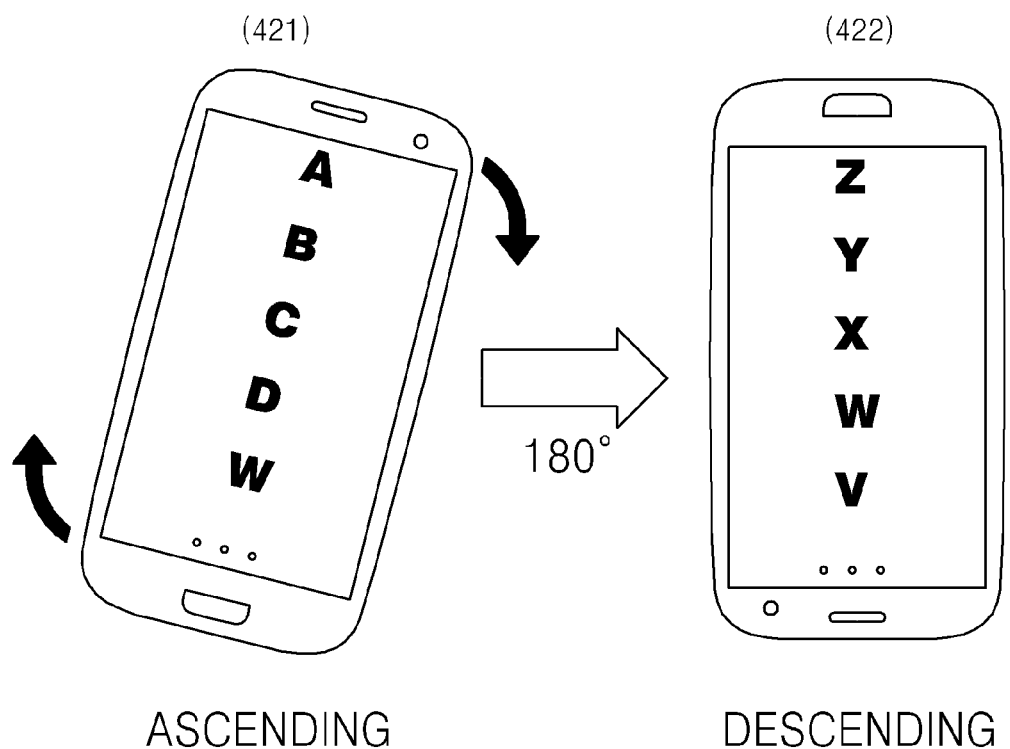

Referring to FIG. 2, when the device 100 is in the active mode and displays a specific list, and the motion information of the device 100 indicates the 180° rotation in the clockwise direction, a list sorting change function may be a preset function that may be performed by the device 100 as shown in FIG. 4I. That is, when the motion information of the device 100 indicates the 180° rotation in the clockwise direction, the processor 103 may change the screen 421 of a list sorted in ascending order of FIG. 4I to the screen 422 of a list sorted in descending order.

Referring to FIG. 2, when the device 100 is in the active mode, and the motion information of the device 100 indicates the 270° rotation in the clockwise direction, a preset function may be set to perform a voice recording function irrespective of a function that is executed by the device 100. For example, when the device 100 displays a home screen, if a sensing value indicating the 270° rotation of the device 100 in the clockwise direction is received, the device 100 may perform the voice recording function according to information regarding a preset function.

The information regarding the preset function of the device 100 according to the operation mode of the device 100 and the motion information of the device 100 are not limited to as defined in FIG. 2. For example, the motion information of the device 100 may be defined only information regarding an upside-down (180° rotation of the device 100) motion in the clockwise direction. The motion information of the device 100 may be defined only motion information 423 indicating horizontal holding of the device 100 and vertical lifting of the device 100 as shown in FIG. 4J. Information regarding the preset function corresponding to the motion information 423 may match information regarding one of functions defined in FIG. 2. However, the function information capable of matching the motion information 423 is not limited to FIG. 2.

The motion information of the device 100 is not limited as described above. For example, the motion information of the device 100 may include motion information indicating vertical holding of the device 100 and vertical lifting of the device 100, motion information indicating vertical holding of the device 100 and moving of the device 100 by a preset distance in a left and/or right direction, and motion information indicating horizontal holding of the device 100 and moving of the device 100 by a preset distance in the left and/or right direction. The preset distance may be defined as a distance greater than a minimum distance that may be recognized that the device 100 moves in a left or right direction by using the sensor 101. The minimum distance may be determined according to a sensor included in the sensor 101.

FIG. 4J shows a case where the processor 103 executes a previously set application when the device 100 is in the standby mode, and a sensing value indicating horizontal holding of the device 100 and vertical lifting of the device 100 is received from the sensor 101. The sensing value indicating horizontal holding of the device 100 and vertical lifting of the device 100 may be set as, for example, an x axis variation smaller than 30°, a y axis variation greater than 90°, and an acceleration variation greater than T, wherein T is an integer, but is not limited thereto. That is, the sensing value may be determined according to the sensor included in the sensor 101.

The at least one program stored in the storage 102 may include an application execution program, a service execution program, a content storage program, a content reproduction program, etc.

The processor 103 may execute the at least one program stored in the storage 102 as described above, and may recognize the motion information of the device 100 by using a value sensed by the sensor 101 and information stored in the storage 102.

The processor 103 may detect the operation mode of the device 100. When information regarding the operation mode of the device 100 is stored in a flag register of the processor 103 or in a preset area of the storage 102, the processor 103 may determine the operation mode of the device 100 by reading the information regarding the operation mode of the device 100 from the flag register or from the above-described preset area of the storage 102. The determining of the operation mode of the device 100 may be referred to as detecting of the operation mode of the device 100. The processor 103 may include a random access memory (RAM) including the above-described flag register.

The processor 103 may be one or more processors for controlling a general operation of the device 100. The processor 103 may control operations of the sensor 101, the storage 102, and the information input/output unit 104. The processor 103 may be a controller, a microprocessor, a digital signal processor, etc.

Figure 5:
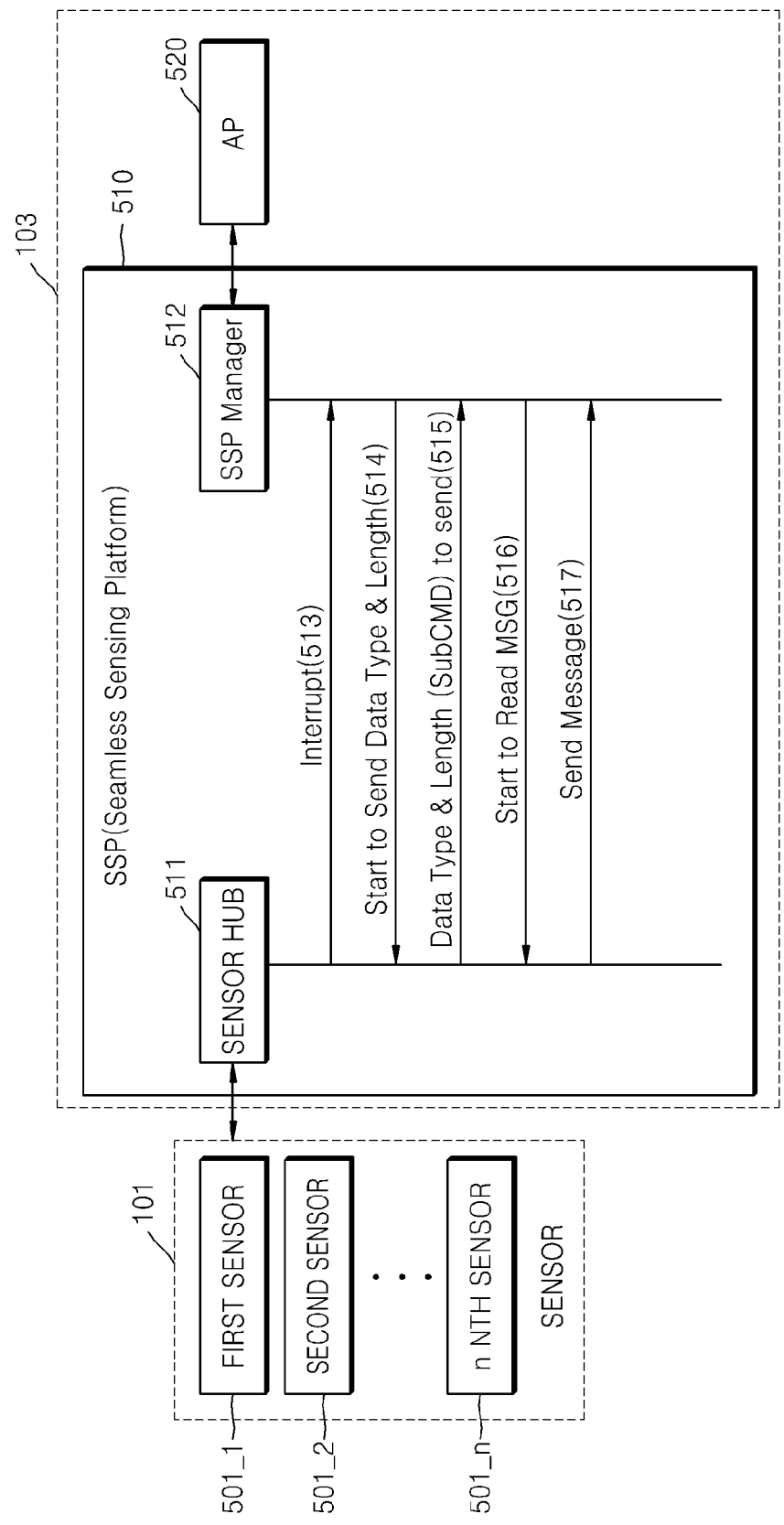
FIG. 5 is a block diagram for explaining an operation between a sensor and a processor based on a seamless sensing platform (SSP), according to an exemplary embodiment.

The processor 103 may include a low power processor 510 that control the sensor 101 by using a seamless sensing platform (SSP) as shown in FIG. 5 and an application processor (AP) 520. The low power processor 510 may be defined as an auxiliary processor. The application processor 520 may be defined as a main processor. FIG. 5 is a block diagram for explaining an operation between the sensor 101 and the processor 103 based on the SSP, according to an exemplary embodiment.

The low power processor 510 of FIG. 5 may be a low power micro control unit (MCU) operating in a standby mode of the device 100 described in FIG. 1 above. The low power processor 510 may include a sensor hub 511 and a SSP manager 512. The sensor 101 may include first through nth sensors 501_1~501_n which may be attached to the sensor hub 511. The SSP manager 512 may be included in a framework of the application processor 520.

The sensor hub 511 may receive values sensed from the first through nth sensors 501_1~501_n. The first through nth sensors 501_1~501_n may transmit the sensed values based on communication such as Bluetooth low energy communication to the sensor hub 511. Communication between the first through nth sensors 501_1~501_n and the sensor hub 511 is not limited to the Bluetooth low energy communication.

When the operation mode of the device 100 is in the standby mode, the application processor 520 may be set in the standby mode. When the application processor 520 is set in the standby mode, if the operation mode of the application processor 520 is changed to an active mode, the sensor hub 511 may perform data communication with the SSP manager 512 by using a data communication protocol based on the SSP. The case where the standby mode of the application processor 520 is changed to the active mode may be determined according to information regarding a preset function that needs to be executed by the device 100 described in the above-described embodiments.

The operation between the sensor hub 511 and the SSP manager 512 is as follows. That is, the sensor hub 511 transmits an interrupt signal indicating that there is data that is to be transmitted to the SSP manager 512 (513). The SSP manager 512 transmits a signal requesting a data type and a length that are to be transmitted by the sensor hub 511 to the sensor hub 511 (514). The sensor hub 511 transmits information regarding the data type and the length that are to be transmitted to the SSP manager 512 (515). The information transmitted from the sensor hub 511 to the SSP manager 512 is not limited to the data type and the length.

The SSP manager 512 transmits a start to read message MSG to the sensor hub 511 (516). When the sensor hub 511 receives the start to read message MSG (516), the sensor hub 511 makes the sensed values as a previously agreed packet and transmits the packet to the SSP manager 512 (517). The sensed values transmitted from the sensor hub 511 to the SSP manager 512 may be referred to as an electrical signal.

The SSP manager 512 detects motion information from information stored in the storage 102 by using the sensed values received from the sensor hub 511 in the standby mode of the device 100 as described with reference to FIG. 1 above. The SSP manager 512 may detect information regarding a preset function of the device 100 based on the detected motion information and may control the function of the device 100 based on the detected preset function information.

The SSP manager 512 detects the motion information from the information stored in the storage 102 by using the sensed values received from the sensor hub 511 as described in FIG. 1, and checks the operation mode of the device 100 as describe in FIG. 1. The SSP manager 512 may detect the information regarding the preset function from the storage 102 by using the checked operation mode and the detected motion information and may control the function of the device 100 based on the detected preset function information.

The information input/output unit 104 may be in a black screen in the standby mode of the device 100 as described above, a state in which no power is consumed, a deactivation state of a function related to the touch screen, and a deactivation state of a display function related to the touch screen but is not limited thereto.

Figure 6A:
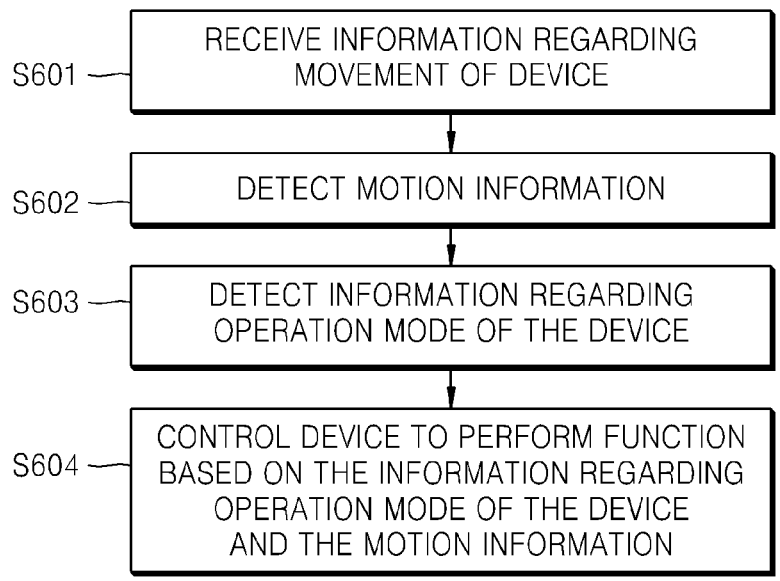
FIG. 6A is a flowchart of a method of performing a function of a device, according to an exemplary embodiment.

FIG. 6A is a flowchart of a method of performing a function of a device, according to an exemplary embodiment. FIG. 6A shows a case where a preset function is performed according to motion information of the device 100 and an operation mode of the device 100. The flowchart of FIG. 6A may be performed by the processor 103 of the device 100.

In operation S601, the processor 103 receives information regarding a movement of the device 100. The information regarding the movement of the device 100 may be received from sensors included in the sensor 101 of FIG. 1 based on the SSP as described with reference to FIG. 5.

The processor 103 detects the preset motion information based on the information regarding the movement of the device 100 (operation S602). When the motion information of the device 100 is detected, the processor 103 detects information regarding the operation mode of the device 100 (operation S603). The detecting of the information regarding the operation mode of the device 100 may be referred to as checking of the operation mode of the device 100.

When the device 100 is in the active mode, the information regarding the operation mode of the device 100 may include information regarding a current state of the device 100. For example, when an application is executed by the device 100, the information regarding the operation mode of the device 100 may include information regarding the application that is currently being executed by the device 100 but is not limited thereto. The detecting of the operation mode of the device 100 in operation S603 may be performed as described with respect to the processor 103 of FIG. 1.

In operation S604, the processor 103 performs the preset function based on the information regarding the operation mode of the device 100 and the motion information of the device 100. The preset function may be detected from the storage 102 as described with reference to FIGS. 2 and 4A through 4J.

Figure 6B:
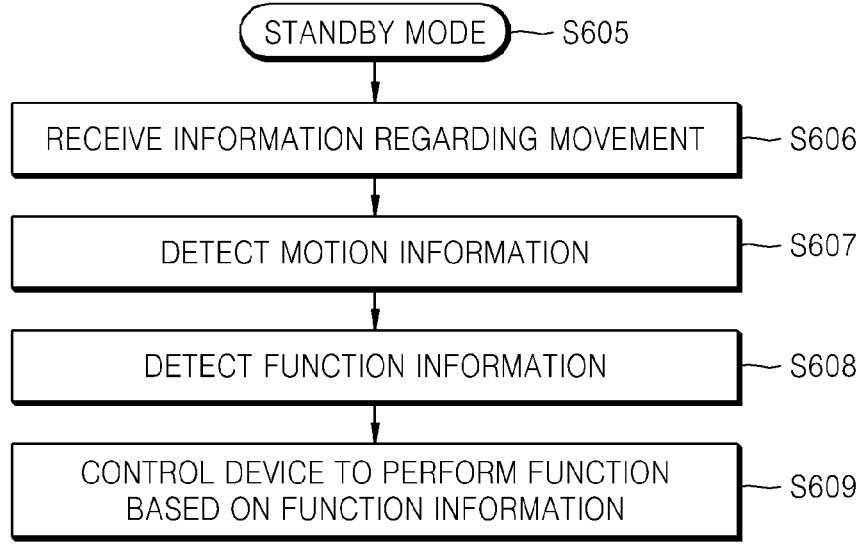
FIG. 6B is a flowchart of a method of performing a function of a device, according to another exemplary embodiment.

FIG. 6B is a flowchart of a method of performing a function of a device, according to another exemplary embodiment. FIG. 6B shows a case where the device 100 is in the standby mode. The flowchart of FIG. 6B may be performed by the processor 103 of the device 100.

Referring to FIG. 6B, when the operation mode of the device 100 is the standby mode, the processor 103 may receive information regarding a movement of the device 100 from the sensor unit 101. In this regard, the processor 103 may be a low power processor 510 of FIG. 5. Thus, the processor 103 may receive the information regarding the movement of the device 100 from the sensor 101 by using a SSP based data communication protocol.

In operation S605, in the standby mode of the device 100, the processor 103 receives the information regarding the movement of the device 100 from the sensor 101 in operation S606. The processor 103 detects motion information from the storage 102 by using the received information regarding the movement (operation S607). When the motion information is detected, the processor 103 detects at least one piece of function information corresponding to the detected motion information in operation S608.

The detecting of the motion information and the at least one piece of function information according to storage structures of the motion information and the at least one piece of function information that are stored in the storage 102 may be referred to as detecting of the at least one piece of function information. For example, when the processor 103 detects the at least one piece of function information from the storage 102 by using the information regarding the movement received from the sensor unit 101, the detecting of the motion information and the at least one piece of function information may be referred to as the detecting of the at least one piece of function information.

The processor 103 controls the device 100 to perform a function based on the at least one piece of function information received from the storage 102 in operation S609. The flowchart of FIG. 6B may be performed as described with reference to FIGS. 4A through 4E and 4J. In operation S609, the processor 103 may display a gateway screen as shown in FIGS. 17 and 18A through 18F that will be described later before the function is performed.

Figure 7:
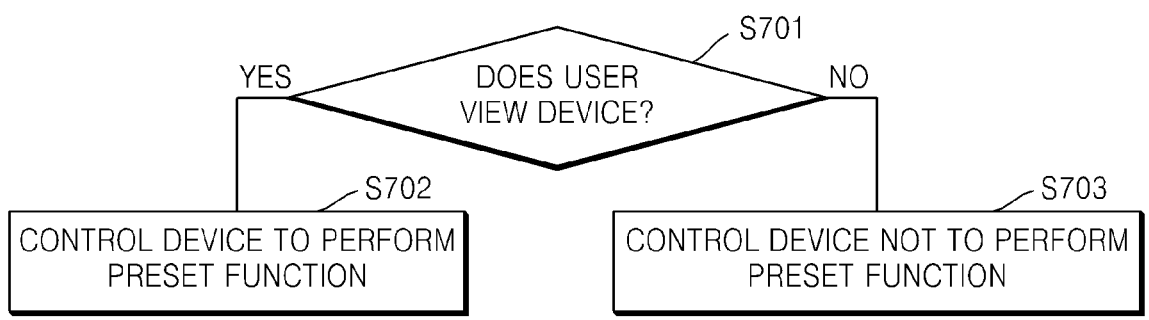
FIG. 7 is a flowchart of a process that may be performed in operation S604 of FIG. 6A or operation S609 of FIG. 6B, according to an exemplary embodiment.

FIG. 7 is a flowchart of a process that may be performed in operation S604 of FIG. 6A or operation S609 of FIG. 6B, according to an exemplary embodiment.

FIG. 7 relates to the process of performing a preset function of the device 100 according to a result of determining whether a user looks at the device 100.

That is, in operation S701, the processor 103 determines whether the user looks at the device 100 before performing the preset function. Whether the user looks at the device 100 may be determined according to whether a user' face is included in an image obtained by using a camera included in the device 100. Alternatively, whether the user looks at the device 100 may be determined according to whether the user's face included in the obtained image is oriented toward the device 100 but is not limited thereto.

The processor 103 may determine whether the user's face is included in the obtained image by using a face region extraction technology. The processor 103 may determine whether the user's face included in the obtained image is oriented toward the device 100 by using a feature value detection method. The feature value detection method detects feature values such as a distance between the eyes, a noise width, a height and shape of a cheekbone, a proportion of a forehead (an area based on a breadth and a height of forehead) on a face, etc. The processor 103 may estimate an orientation direction of the user's face included in the obtained image by using the detected feature value and determine whether the user looks at the device 100.

Instead of the above-described user's face recognition method, it may be determined whether the user looks at the device 100 by detecting the user's eyes from the obtained image and estimating the eyes' movements.

As a result of the determining in operation S701, if it is determined that the user looks at the device 100, the processor 103 controls the device 100 to perform a function based on information regarding the preset function (operation S702).

As a result of the determining in operation S702, if it determined that the user does not look at the device 100, the processor 103 controls the device 100 not to perform the function based on the information regarding the preset function (operation S703).

To determine whether the user looks at the device 100 by using the face region extraction, the feature value detection, or the eyes movement estimation as described above, the storage 102 may store at least one related application program and provide the processor 103 with the related application program according to a request of the processor 103. The processor 103 may execute the related application program provided by the storage 102 and determine whether the user looks at the device 100 as described above.

Figure 8:
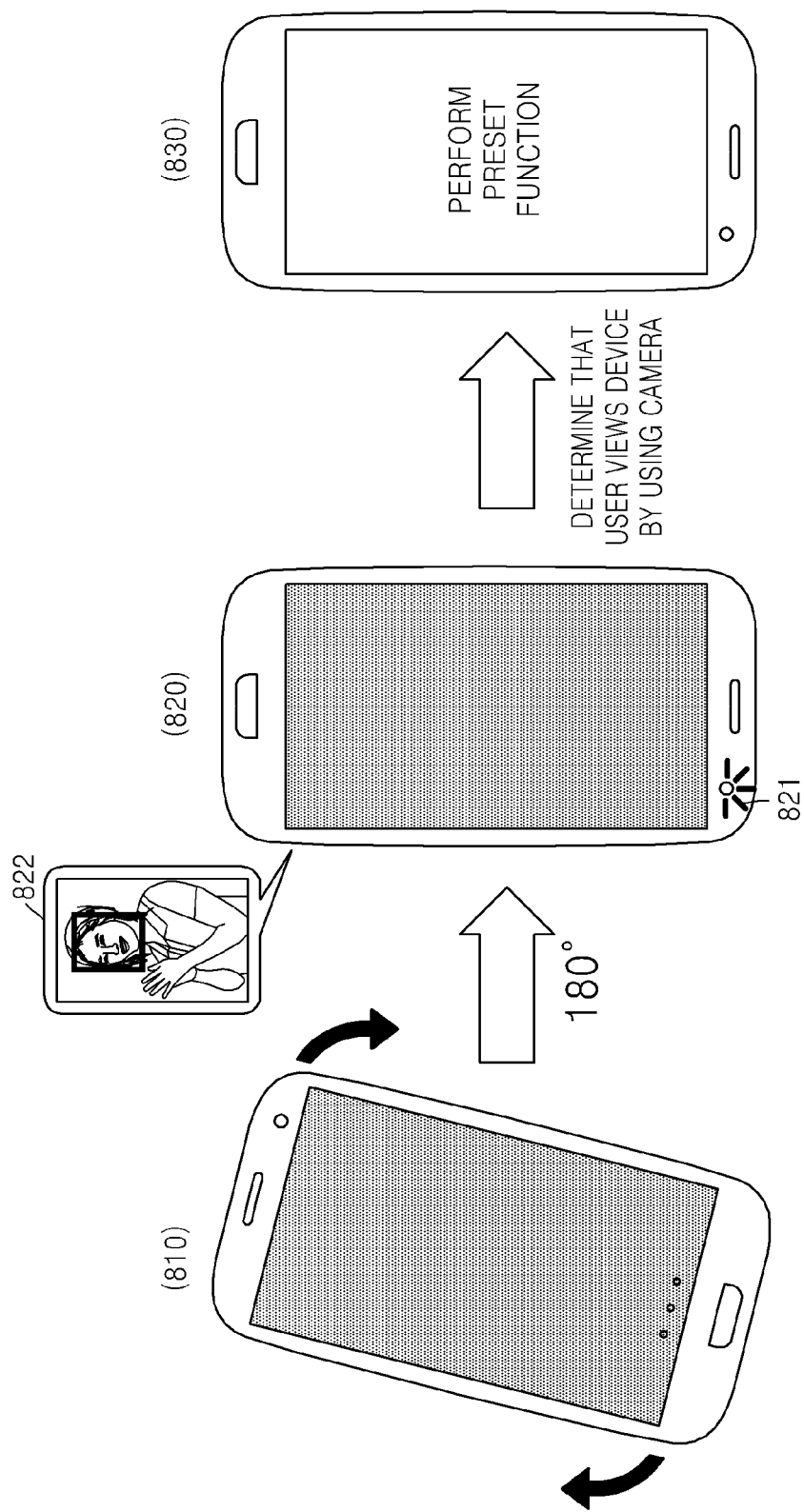
FIG. 8 shows screens for explaining a preset function performed by a device in operations S701 and S702 of FIG. 7, according to an exemplary embodiment.

FIG. 8 shows screens activating a preset function performed by the device 100 in operations S701 and S702 of FIG. 7, according to an exemplary embodiment. That is, when the device 100 is in the standby mode and a screen 810 is in a black screen state as shown in FIG. 8, when it is determined that the device 100 has rotated by 180° in a clockwise direction by using a sensing value, the processor 103 activates a function of a front camera 821. The processor 103 temporarily changes an operation mode of the device 100 to the active mode so as to execute an application related to the front camera 821 as shown by a screen 820. In this regard, the processor 103 may output a black screen via the information input/output unit 104 or the screen on which a camera mode is executed via the information input/output unit 104.

The processor 103 may determine whether a user looks at the device 100 according to the above-described face recognition or eyes estimation regarding an image 822 obtained by using the front camera 821. If it is determined that the user looks at the device 100, the processor 103 performs the preset function according to an operation mode of the device 100 and motion information of the device 100 (screen 830).

Figure 9:
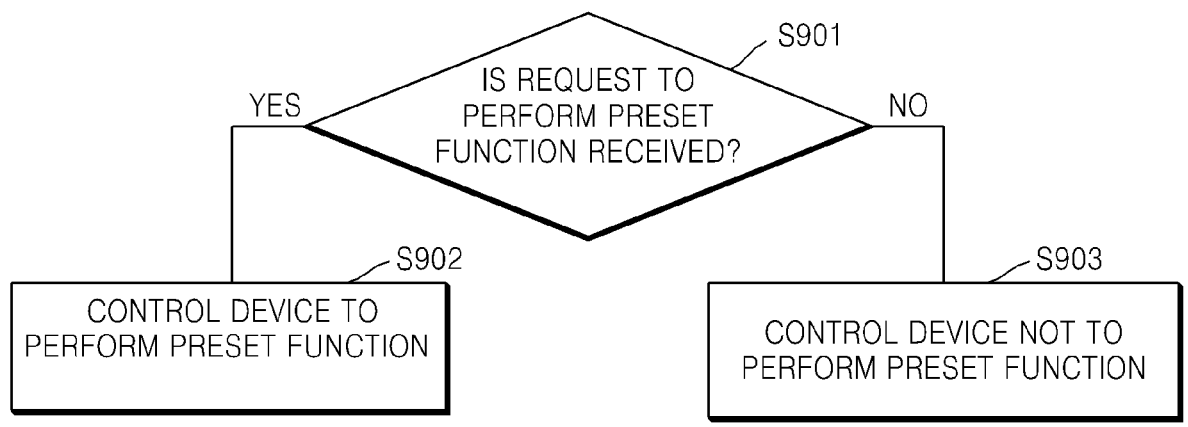
FIG. 9 is a flowchart of a process that may be performed in operation S604 of FIG. 6A or operation S609 of FIG. 6B, according to another exemplary embodiment.

FIG. 9 is a flowchart of a process that may be performed in operation S604 of FIG. 6A or operation S609 of FIG. 6B, according to another exemplary embodiment. FIG. 9 relates to the process of performing a preset function in the device 100 when previously set user gesture based information corresponding to a request to perform the preset function is received.

Figure 10:
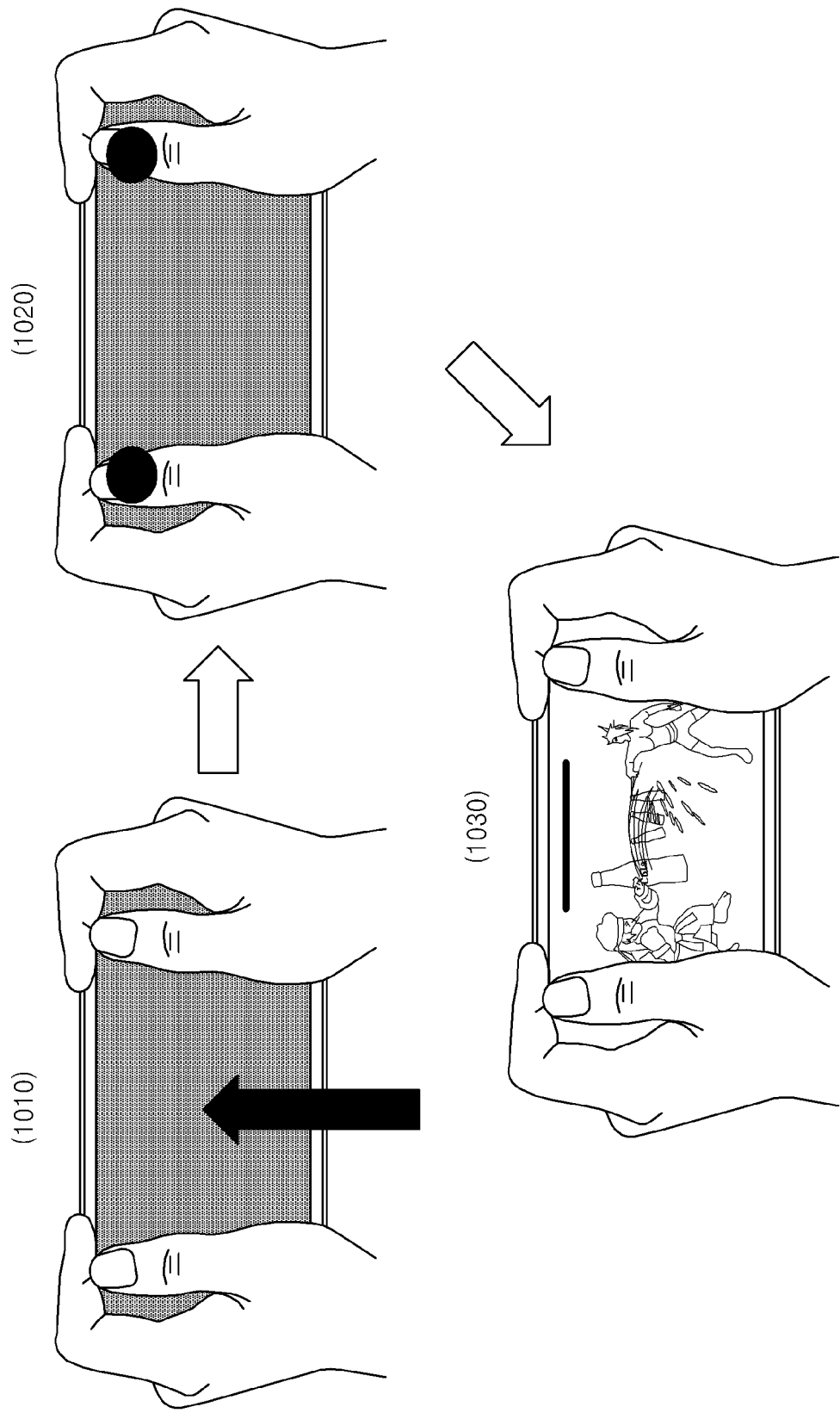
FIG. 10 shows screens for explaining a preset function performed by a device in operations S901 and S902 of FIG. 9, according to another exemplary embodiment.

That is, in operation S901, the processor 103 determines whether the user gesture based information corresponding to the request to perform the preset function is received before performing the preset function. The user gesture based information may be previously defined as a 2-touch (for example, 2-touch based on thumbs of both hands) in a position of horizontally holding the device 100 with both hands as shown in FIG. 10. However, the user gesture based information may be previously defined as 1-touch (for example, 1-touch using a thumb of a hand holding the device 10) in a position of horizontally holding the device 100 with one hand.

The position of the device 100 is not limited to the above-described horizontally held position. For example, the position of the device 100 may include a vertically held position. The horizontally held position as shown in FIG. 10 may indicate that a bezel side of the device 100 that has height information included in size information of the device 100 may be approximately perpendicular to the ground. The vertically held position may indicate that a bezel side of the device 100 that has width information included in the size information of the device 100 may be approximately perpendicular to the ground, The above-described 2-touch and 1-touch may be recognized by using information regarding a previously stored and predicted touch region. The information regarding the previously stored and predicted touch region may be set considering an error range. The information regarding the previously stored and predicted touch region may be previously set according to the size information of the device 100 and size information of user's hands. The size information of the user's hands may be changed according to body size of the user. The size information of the user's hands may be determined by using images of scanned user's hands. The size information of the device 100 may use information included in previously stored specification information of the device 100.

The above-described information regarding the previously stored and predicted touch region may be set through a process of registering a touch region carried out by the user. For example, the user may create the same situation by using the device 100 and register a region touched in the created situation as the predicted touch region. When the predicted touch region is registered, the user may set an available error range.

The above-described user gesture based information may be stored to map information regarding the operation mode of the device 100 and the motion information of the device 100 that are stored in the storage 102.

The above-described user gesture based information stored in the storage 102 may include at least coordinate information of a touch surface. The above-described coordinate information of the touch surface may include a size of the device 100, coordinate information of a touch surface on which a 2-touch based on both thumbs is predicted to occur when the user holds the device 100 with both hands, coordinate information of a touch surface on which a 1-touch based on a right thumb is predicted to occur when the user holds the device 100 with the right hand, and coordinate information of a touch surface on which a 1-touch based on a left thumb is predicted to occur when the user holds the device 100 with the left hand, but is not limited thereto. The coordinate information of the touch surface may include coordinate information indicating a two-dimensional (2D) screen region. In operation S901, if the processor 103 determines that a request to perform a preset function based on the above-described user gesture is received, the processor 103 performs the above-described preset function in operation S902.

In operation S903, if the processor 103 determines that the request to perform the preset function based on the above-described user gesture is not received, the processor 103 does not perform the above-described preset function in operation S903.

FIG. 10 shows screens for explaining a preset function performed by the device 100 in operations S901 and S902 of FIG. 9, according to another exemplary embodiment. When the operation mode of the device 100 is in the standby mode in the case of a screen 1010 of FIG. 10, and the screen 1010 is in a black screen, the processor 103 recognizes motion information of the device 100 by using a sensing value indicating a movement of the device 100 that moves in a vertical direction more than a preset distance.

After recognizing the motion information of the device 100, the processor 103 recognizes that a multi-touch with thumbs of both hands holding the device 100 has occurred (operation S1020), the processor 103 performs the preset function determined according to the operation mode of the device 100 and the motion information of the device 100 (operation S1030). FIG. 10 shows a case where the preset function continuously executes applications that have been executed just before the device 100 is enters the standby mode.

Figure 11:
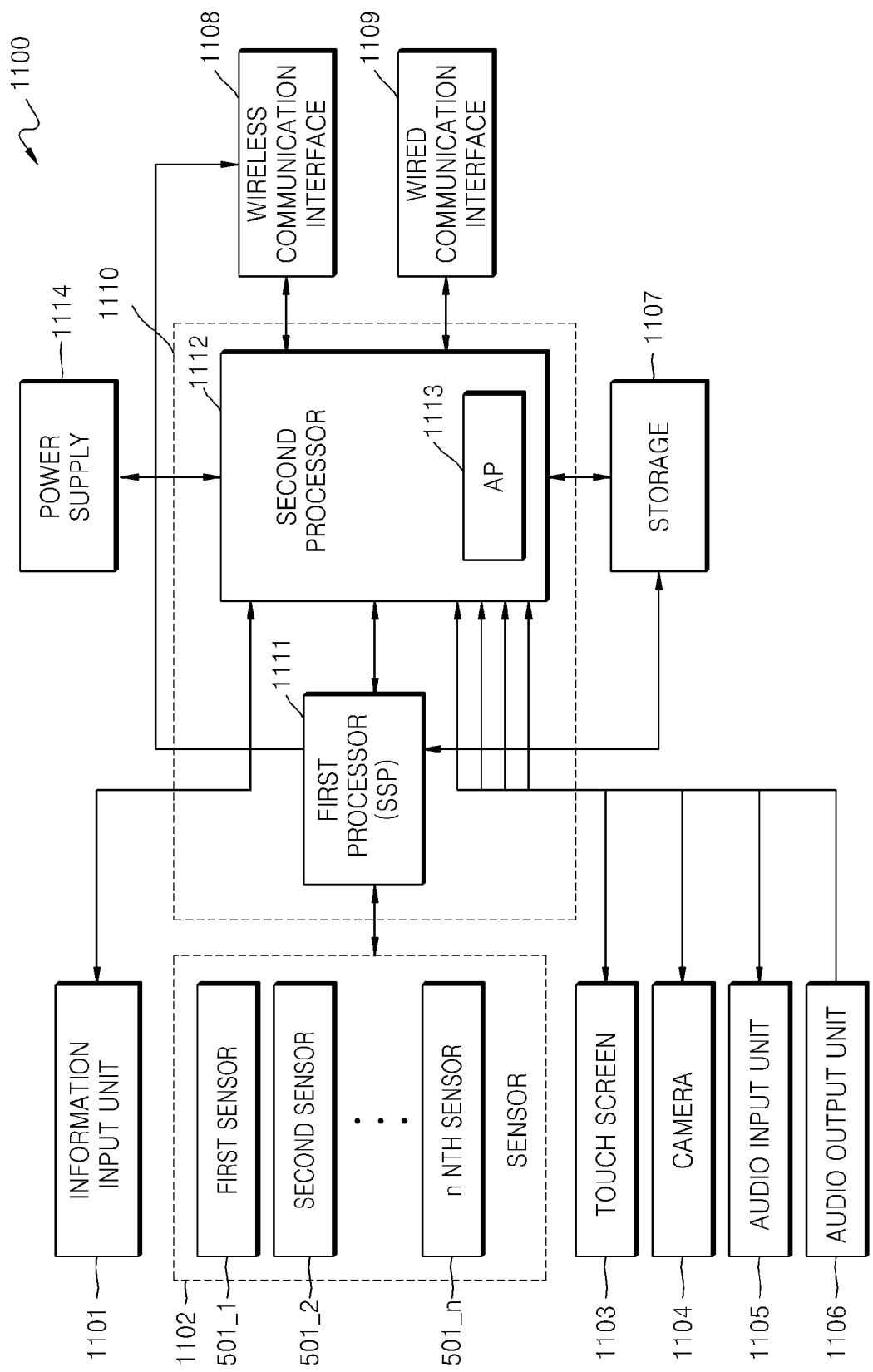
FIG. 11 is a block diagram of a device, according to another exemplary embodiment.

FIG. 11 is a block diagram of a device 1100, according to another exemplary embodiment. Referring to FIG. 11, the device 1100 includes an information input unit 1101, a sensor 1102, a touch screen 1103, a camera 1104, an audio input unit 1105, an audio output unit 1106, a storage 1107, a wireless communication interface 1108, a wired communication interface 1109, a processor 1110, and a power supply 1114. However, elements of the device 1100 are not limited to those shown in FIG. 11. That is, the device 1100 may include more or fewer constituent elements than those shown in FIG. 11. Also, the device 1100 may not include, for example, the wired communication interface 1109.

The device 1100 of FIG. 11 may perform a preset function according to a movement thereof when the device is in a standby mode based on a first processor 1111 irrespective of an operation of a second processor 1112. The first processor 1111 may be the above-described low power processor, and the second processor 1112 may be the above-described application processor but are not limited thereto. The relationship between the first processor 1111 and the second processor 1112 will be described in more detail below when the corresponding elements are described.

The standby mode of the device 1100 may include a low power consumption state described with reference to FIG. 1 that is a power consumption state of the sensor 1102, the first processor 1111, and the storage 1107. The standby mode of the device 1100 may include a state in which power is not consumed by an element of the device 1100 other than the sensor 1102, the first processor 1111, and the storage 1107. The standby mode of the device 1100 may include a deactivation state of an application processor (AP) 1113 of the second processor 1112. The standby mode of the device 1100 may include a black screen state of the touch screen 1103. The standby mode of the device 1100 may include at least one of a deactivation state of a function related to the touch screen 1103 and a deactivation state of a touch sensing function of the touch screen 1103. The standby mode of the device 1100 is not limited thereto.

The information input unit 1101 may be in a state in which power is not consumed in the standby mode of the device 1100. The information input unit 1101 may be in a deactivation state in the standby mode of the device 1100. The information input unit 1101 may input data used to control an operation of the device 1100. For example, the information input unit 1101 may input a power on/off command of the device 1100. The information input unit 1101 may include a key pad, a dome switch, a job wheel, a jog switch, a hardware button, a hot key, a touch panel, etc. but is not limited thereto.

The sensor 1102 may be in an active state in the standby mode and an active mode of the device 1100. The sensor 1102 may be the same as described with reference to the sensor 101 of FIG. 1 and output a signal of sensing a movement of the device 1100. The sensor 1102 may be referred to as a movement sensor for detecting the movement of the device 1100.

The sensor 1102 generates a signal for sensing a location of the device 1100, whether there is any user contact, an orientation of the device 1100, an acceleration or deceleration of the device 1100, etc. The sensor 1102 may include a proximity sensor and a motion sensor. The proximity sensor is a sensor for detecting whether an object approaches a previously set detection surface or whether the object is present nearby by using a force of an electromagnetic field or an infrared ray without any actual physical touch. Examples of the proximity sensor include a transparent photoelectric sensor, a direct reflective photoelectric sensor, a mirror reflective photoelectric sensor, a high frequency oscillation photoelectric sensor, a capacitive photoelectric sensor, a magnetic photoelectric sensor, an infrared photoelectric sensor, etc.

The sensor 1102 may output a signal for sensing a sensor based user gesture. The sensor 1102 may include the first through nth sensors 501_1~501_n like the sensor 101 of FIG. 5. The sensor 1102 may operate in both the standby mode of the device 1100 and the active mode of the device 1100.

The touch screen 1103 may be in a black screen state as described above in the standby mode of the device 1100. The touch screen 1103 may be in a state in which no power is consumed in the standby mode of the device 1100. The touch screen 1103 may be in a deactivation state of the function related to the touch screen 1103 and/or a deactivation state of the touch sensing function of the touch screen 1103 in the standby mode of the device 1100. The touch screen 1103 may output a screen or information indicating a screen lock set state in the standby mode of the device 1100. The touch screen 1103 may be in the deactivation state in the standby mode of the device 1100.

The touch screen 1103 may be a resistive (decompression) or capacitive touch screen but is not limited thereto. The touch screen 1103 may receive user input information that depends on the above-described user touch based gesture. The user input information that depends on the user touch based gesture may be defined as various combinations of a touch frequency, a touch pattern, a touch area, and a touch intensity.

The touch screen 1103 may include various sensors for sensing a touch or proximity touch thereon. Sensors included in the touch screen 1103 may generate a signal by sensing the touch based user gestures or patterns. A proximity sensor for the touch screen 1103 may be the same as the proximity sensor included in the sensor 1102.

An example of the sensor for sensing the touch of the touch screen 1103 may include a tactile sensor. The tactile sensor may sense various types of information such as roughness of a touch surface, hardness of a touch object, a temperature at a touch point, etc.

The touch of the touch screen 1103 may mean touching a touch panel by using a pointer. A proximity touch of the touch screen 1103 occurs when the pointer does not actually touch the touch panel but approaches the touch panel within a preset distance. Examples of the pointer may include a stylus pen, or a user's finger, etc., but are not limited thereto.

The touch screen 1103 displays information output by the device 1100. For example, the touch screen 1103 may display a screen responding to user gestures or touch patterns sensed through sensors included in the touch screen 1103. The touch screen 1103 may display a screen responding to control data or user input information input through the user input unit 1101. The touch screen 1103 may display a screen responding to a signal sensed through the sensor 1102. The touch screen 1103 may display at least one of the above-described screens as shown in FIGS. 4A through 4J.

The touch screen 1103 may be referred to as an input and output apparatus. A screen displayed on the touch screen 1103 includes a user interface (UI) screen or a graphical user interface (GUI) screen.

The touch screen 1103 may include a liquid crystal display (LCD), a thin film transistor liquid crystal display (TFT-LCD), an organic light-emitting diode (OLED), a flexible display, a 3D display, or an active matrix OLED (AMOLED), but is not limited thereto. The touch screen 1103 may be referred to as a display. The device 1100 may include two or more touch screens 1103. When the device 1100 includes two or more touch screens 1103, the touch screen 1103 may be configured as a dual touch mode. The dual touch mode may refer to a front touch mode of the device 1100 and a back touch mode of the device 1100 but is not limited thereto.

The camera 1104 processes an image frame such as a still image or a moving image obtained by an image sensor (or a photo sensor) in a video call mode or a photographing mode. The image frame processed by the camera 1104 may be displayed on the touch screen 1103. The image frame processed by the camera 1104 may be stored in the storage 1107 or transmitted to the outside through the wireless communication interface 1108 or the wired communication interface 1109.

The camera 1104 may be in a state in which no power is consumed in the standby mode of the device 1100. The camera 1104 may be in a deactivation state in the standby mode of the device 1100. The camera 1104 may include two or more cameras according to the configuration of the device 1100. That is, the device 1100 may include a front camera and a rear camera of the device 1100. The front camera may operate so as to recognize a user's face or obtain an image for estimating movements of user's eyes as shown in FIG. 8 in the standby mode of the device 1100. The estimating of the movements of user's eyes may be referred to as tracking of the movements of user's eyes. The camera 1104 may be used as an input apparatus for recognizing a user space gesture.

The audio input unit 1105 may be a state in which no power is consumed in the standby mode of the device 1100. The audio input unit 1105 may be a deactivation state in the standby mode of the device 1100. The audio input unit 1105 may receive an input of an external acoustic signal in a call mode, a recording mode, or a voice recognition mode, convert the acoustic signal to electrical voice data, and transmit the electrical voice data to the processor 1110. The audio input unit 1105 may be, for example, a microphone. The audio input unit 1105 may include a function based on diverse noise removal algorithms for removing noise generated during a process for receiving the external acoustic signal.

The audio input unit 1105 may be activated if the recording icon of FIG. 4B is selected. The external acoustic signal input through the audio input unit 1105 may be stored in the storage 1107 through the processor 1110. The external acoustic signal input through the audio input unit 1105 may be transmitted to the outside via the processor 1110 and the wireless communication interface 1108. The external acoustic signal input through the audio input unit 1105 may be transmitted to the outside via the processor 1110 and the wired communication interface 1109.

The audio output unit 1106 may be a state in which no power is consumed in the standby mode of the device 1100. The audio output unit 1106 may be a deactivation state in the standby mode of the device 1100. The audio output unit 1106 outputs the acoustic signal or an audio signal that is received from the outside or read from the storage 1107 in the call mode or an audio reproduction mode. The audio output unit 1106 may be a speaker. If an audio signal is included in content when the content is reproduced, the audio output unit 1106 outputs the audio signal included in the reproduced content. The audio input unit 1105 and the audio output unit 1106 may be integrally formed within a head set.

The storage 1107 may operate in the standby mode and the active mode of the device 1100. The storage 1107 may be in an activation state in the standby mode and the active mode of the device 1100. The storage 1107 may store at least one program and/or a command set and resource that are configured to be executed in the processor 1110 that will be described later.

The at least one program may include at least one program for executing a method of performing a function of the device 1100 according to an exemplary embodiment. The at least one program may include an operating system program of the device 1100, an application program related to diverse functions (or services) performed by the device 1100, and a program for driving hardware components included in the device 1100, and an application program for controlling at least one external device of the device 1100 but is not limited thereto.

The external device may include an accessory of the device 1100. The accessory is referred to as a device of which function is controlled by the device 1100 since an application program related to the accessory is performed by the device 1100 but is not limited thereto.

The storage 1107 may store at least one program capable of determining whether a value sensed by the sensor 1102 corresponds to preset motion information of the device 1100 and data related to the at least one program.

The first processor 1111 may load the at least one program stored in the storage 1107, execute the loaded program, and determine whether the sensing value corresponds to the preset motion information of the device 1100. That is, when the program is executed, if the first processor 1111 receives the sensing value from the sensor 1102, the first processor 1111 may detect the preset motion information corresponding to a sensing value received from the storage 1107 by using the received sensing value.

The at least one program used to determine whether the sensing value corresponds to the preset motion information of the device 1100 may be previously stored in the first processor 1111. The first processor 1111 may include a memory such as random access memory (RAM) to store the at least one program.

The resource stored in the storage 1107 may include mapping information between the sensing value, the preset motion information of the device 1100, and preset function information of the device 1100 as described with reference to FIG. 2 above. The resource stored in the storage 1107 may include information regarding the device 1100, information necessary for operating the application program set in the device 1100, and information necessary for executing a program for driving the hardware components but is not limited thereto.

The information regarding the device 1100 may include user information of the device 1100 but is not limited thereto. The storage 1107 may store the information as described with reference to FIGS. 7 and 9 above.

The storage 1107 may include at least one type of storage medium, such as a flash memory type, a hard disk type, a multimedia card micro type, a card type memory (for example, SD, XD memory, etc.), read only memory (ROM), electronically erasable programmable ROM (EEPROM), programmable ROM (PROM) magnetic memory, and an optical disk but is not limited thereto.

The at least one program and/or the command set that are stored in the storage 1107 may be classified as a plurality of modules according to functions.

Figure 12:
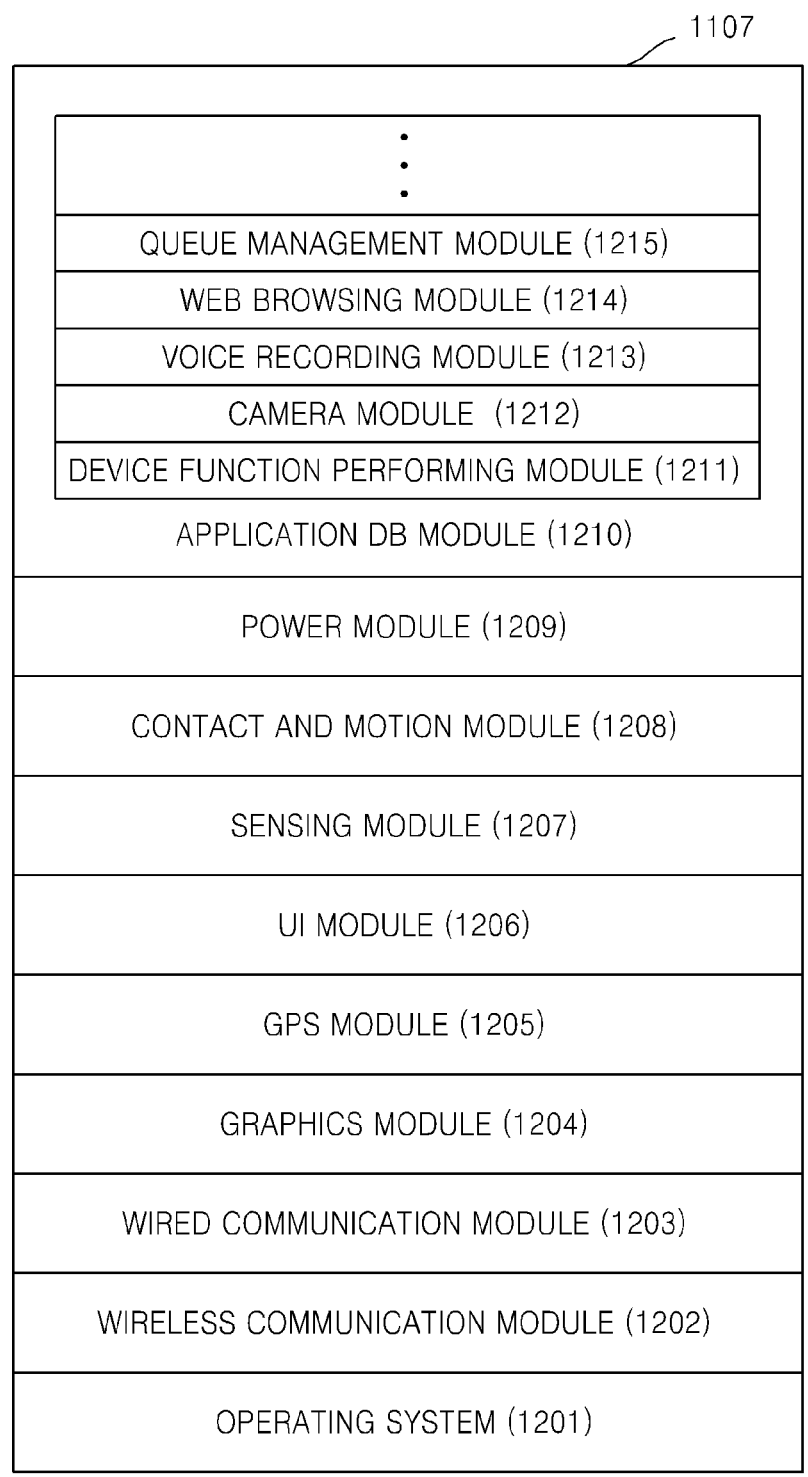
FIG. 12 shows an example of programs and/or command sets that are stored in a storage of FIG. 11.

FIG. 12 shows an example of programs and/or command sets that are stored in the storage 1107. Referring to FIG. 12, the storage 1107 includes an operating system 1201, a wireless communication module 1202, a wired communication module 1203, a graphics module 1204, a global positioning system (GPS) module 1205, a UI module 1206, a sensing module 1207, a contact and motion module 1208, a power module 1209, and an application database (DB) module 1210 but is not limited thereto.

The application DB module 1210 may include a device function performing module 1211, a camera module 1212, a voice recording module 1213, a web browsing module 1214, and a queue management module 1215 but is not limited thereto. For example, the application DB module 1210 may further include diverse application modules such as an e-mail module, a social networking service (SNS) module, a video conference module, an image management module, a browsing module, a calendar module, a widget module, a search module, and a word processing module.

The operating system 1201 may control and manage a general function of the device 1100. The operating system 1201 may include a software component for enabling communication between hardware and software components included in the device 1100.

The wireless communication module 1202 may enable communication with at least one external device through the wireless communication interface 1108. The wireless communication module 1202 may include a software component for processing data received from and transmitted to the at least one external device through the wireless communication interface 1208. The wireless communication module 1202 may enable wireless communication with a server (not shown) or a relay (not shown) through the wireless communication interface 1108. However, a wireless communication object is not limited to those described above.

The wired communication module 1203 may enable communication with the wired communication interface 1109 configured as an element such as a universal serial bus (USB) port and at least one external device (not shown). The wired communication module 1203 may include a software component for processing data received from and transmitted to the at least one external device through the wired communication interface 1109.

The graphics module 1204 may include a software component for brightness adjustment and rendering of graphics displayed on the touch screen 1103 and a software component for providing a virtual keyboard (or a soft keyboard) for inputting text in the application module 1210.

The GPS module 1205 may include a software component for determining a location of the device 1100 and providing the determined location to an application that provides a location based service. The UI module 1206 may include a software component for providing a UI necessary for an application that provides touch screen 1103 based UI information.

The sensing module 1207 may include a software component for determining a sensing value received from the sensor 1102 and providing the sensing value to a specific application included in the application DB module 1210 based on a result of determining. For example, if the sensing value received from the sensor 1102 is information regarding a movement of the device 1100, the sensing module 1207 transmits the received sensing value to the device function performing module 1211.

The device function performing module 1211 detects motion information of the device 1100 corresponding to the received sensing value from the storage 1107. When the motion information of the device 1100 corresponding to the received sensing value is detected, the device function performing module 1211 may check an operation mode of the device 1100 by using information stored in the storage 1107 or information stored in a flag register that is not shown and is included in the first processor 1111. A time when the operation mode of the device 1100 is checked is not limited to that described above. For example, the operation mode of the device 1100 may be checked before the sensing value is received.

The device function performing module 1211 may detect information regarding the checked operation mode and preset function information mapping the detected motion information and perform a function corresponding to the detected preset function information.

The device function performing module 1211 may operate according to the operation mode of the device 1100 without checking the operation mode of the device 1100.

That is, the device function performing module 1211 may operate in a standby mode of the device 1100 as described with reference to FIG. 6B above. In more detail, the device function performing module 1211 may receive the sensing value in the standby mode of the device 1100. The receiving of the sensing value in the standby mode of the device 1100 may be performed as described with reference to FIG. 5 above.

When the sensing value is received in the standby mode of the device 1100, the device function performing module 1211 detects the motion information of the device 1100 from the storage 1107 by using the received sensing value. The device function performing module 1211 may detect the preset function information mapping the detected motion information by using the detected motion information of the device 1100 and perform the function corresponding to the detected preset function information.

The device function performing module 1211 may detect the motion information and the preset function information of the device 1100 from the storage 1107 according to the received sensing value in an active mode of the device 1100 and perform the function corresponding to the detected preset function information.

The contact and motion module 1208 may include a software component for detecting a touch contact based on the touch screen 1103 and providing a result of tracking a movement of the device 1100 based on the touch contact to a specific application included in the application DB module 1210. For example, the contact and motion module 1208 transmits information regarding the detected touch contact to the device function performing module 1211 if the touch contact based on the touch screen 1103 is detected as described with reference to FIG. 10 above.

The power module 1209 includes a software component for linking with the operating system 1201, controlling a power supply that supplies power to hardware components included in the device 1100, and controlling a sleep mode with respect to power supplied to the touch screen 1103.

The storage 1107 may not store the modules included in the application DB module 1210 among the program and/or command set of FIG. 12 and may store only location information such as a uniform resource locator (URL) of an application module and display information indicating the application module.

In this case, the processor 1110 may be connected to an external device including application DB through the wireless communication interface 1108 or the wired communication interface 1109 by using the location information and use a corresponding program and/or a corresponding command set stored in the external device. In this regard, the external device includes a cloud server or a device including the application DB but is not limited thereto.

In addition, when a user selection signal based on information regarding the application module displayed on the touch screen 1103 is received, the processor 1110 may use information stored in the external device through the wireless communication interface 1108 or the wired communication interface 1109 by using the location information of the application module selected by a user.

The storage 1107 may store information stored in the storage 102 of FIG. 1. The storage 1107 may further store user schedule information and log information of the device 1100. The user schedule information and the log information of the device 1100 that are stored in the storage 1107 may be provided to the first processor 1111 as context information of the device 1100. The first processor 1111 may request the context information of the device 1100 or the user schedule information and the log information of the device 1100 from the storage 1107.

The wireless communication interface 1108 may be a state in which no power is consumed in the standby mode of the device 1100. The wireless communication interface 1108 may be in a deactivation state in the standby mode of the device 1100. The wireless communication interface 1108 may be controlled by the first processor 1111 and set in an active mode in the standby mode of the device 1100.

The wireless communication interface 1108 may transmit and receive data to and from the external device over a wireless network including wireless Internet, wireless Intranet, a wireless phone network, a wireless local area network (LAN), a Wi-Fi network, a Wi-Fi direct (WFD) network, a 3G network, a 4G Long Term Evolution (LTE) network, a Bluetooth network, an infrared data association (IrDA) network, a RFID network, a ultra wideband (UWB) network, and a Zigbee network.

The wireless communication interface 1108 may include at least one of a broadcasting reception module, a mobile communication module, a wireless Internet module, a short distance communication module, and a location information module, but is not limited thereto.

The wired communication interface 1109 may be a state in which no power is consumed in the standby mode of the device 1100. The wired communication interface 1109 may be in a deactivation state in the standby mode of the device 1100. The wired communication interface 1109 may transmit and receive data to and from the external device over a wired network such as wired Internet. The wired communication interface 1109 may transmit and receive data to and from an external device (not shown) by using a plug and play interface such as a USB port (not shown).

The power supply 1114 supplies power to a hardware component included in the device 1100. The power supply 1114 includes one or more power sources such as a battery and an alternating current (AC) power source. The device 1100 may not include the power supply 1114 but may include a connection unit (not shown) that may be connected to an external power supply (not shown). The power supply 1114 may supply power to the sensor 1102, the first processor 1111, and the storage 1107 in the standby mode of the device 1100. The power supply 1114 may not supply power to an element other than the sensor 1102, the first processor 1111, and the storage 1107 in the standby mode of the device 1100.

The processor 1110 may be one or more processors that control a general operation of the device 1100. The processor 1110 may generally control the information input unit 1101, the sensor 1102, the touch screen 1103, the camera 1104, the audio input unit 1105, the audio output unit 1106, the storage 1107, the wireless communication interface 1108, the wired communication interface 1109, and the power supply 1114 by using the operating system 1201 and the modules 1202 through 1215 included in the storage 1107. Thus, the processor 1110 may be a controller, a microprocessor, or a digital signal processor.

The processor 1110 may also provide a UI based on the information input unit 1101, the sensor 1102, the touch screen 1103, the camera 1104, and the audio input unit 1105 by using the operating system 1201 and the UI module 1206.

The processor 1110 may execute at least one program related to the method of performing the function of the device 1100 according to an exemplary embodiment and perform a method as shown in a flowchart of FIG. 6A or FIG. 6B or a flowchart of FIG. 13A or 13B that will be described later.

The processor 1110 may execute the program by reading the program from the storage 1107. The processor 1110 may execute the program by downloading the program from an external device connected through the wireless communication interface 1108 or the wired communication interface 1109. The external device may be an application providing server or an application market server. The external device may include a cloud server or a communicable device near the device 1100 but is not limited thereto. The processor 1110 may include an interface function unit between various hardware components included in the device 1100 and the processor 1110.

The processor 1110 includes the first processor 1111 and the second processor 1112. The first processor 1111 may correspond to the low power processor 510 of FIG. 5, and the second processor 1112 may correspond to the application processor 520 of FIG. 5 but are not limited thereto. The second processor 1112 of FIG. 11 may include the AP 1113 since an additional processor such as a communication processor (CP) may be included in the second processor 1112. The CP is a processor for controlling a communication based operation.

A standby mode of the second processor 1112 may indicate that the device 1100 is in the standby mode. The standby mode of the second processor 1112 may indicate that the AP 1113 is in the standby mode.

The first processor 1111 may operate as described above in the standby mode of the device 1100. When the AP 1113 of the second processor 1112 needs to be awakened so as to perform a function based on preset function information detected by the first processor 1111, the first processor 1111 may transmit an active mode setting request signal to the AP 1113. The first processor 1111 may be configured as a MCU as described above.

The first processor 1111 may be connected to the wireless communication interface 1108 and receive context information of the device 1100 such as location information of the device 1100 and time information thereof from the outside. To this end, the first processor 1111 may set the wireless communication interface 1108 that is set in the deactivation state to the active mode in the standby mode of the device 1100. The setting of the active mode of the wireless communication interface 1108 may be temporarily performed.

Figure 13A:
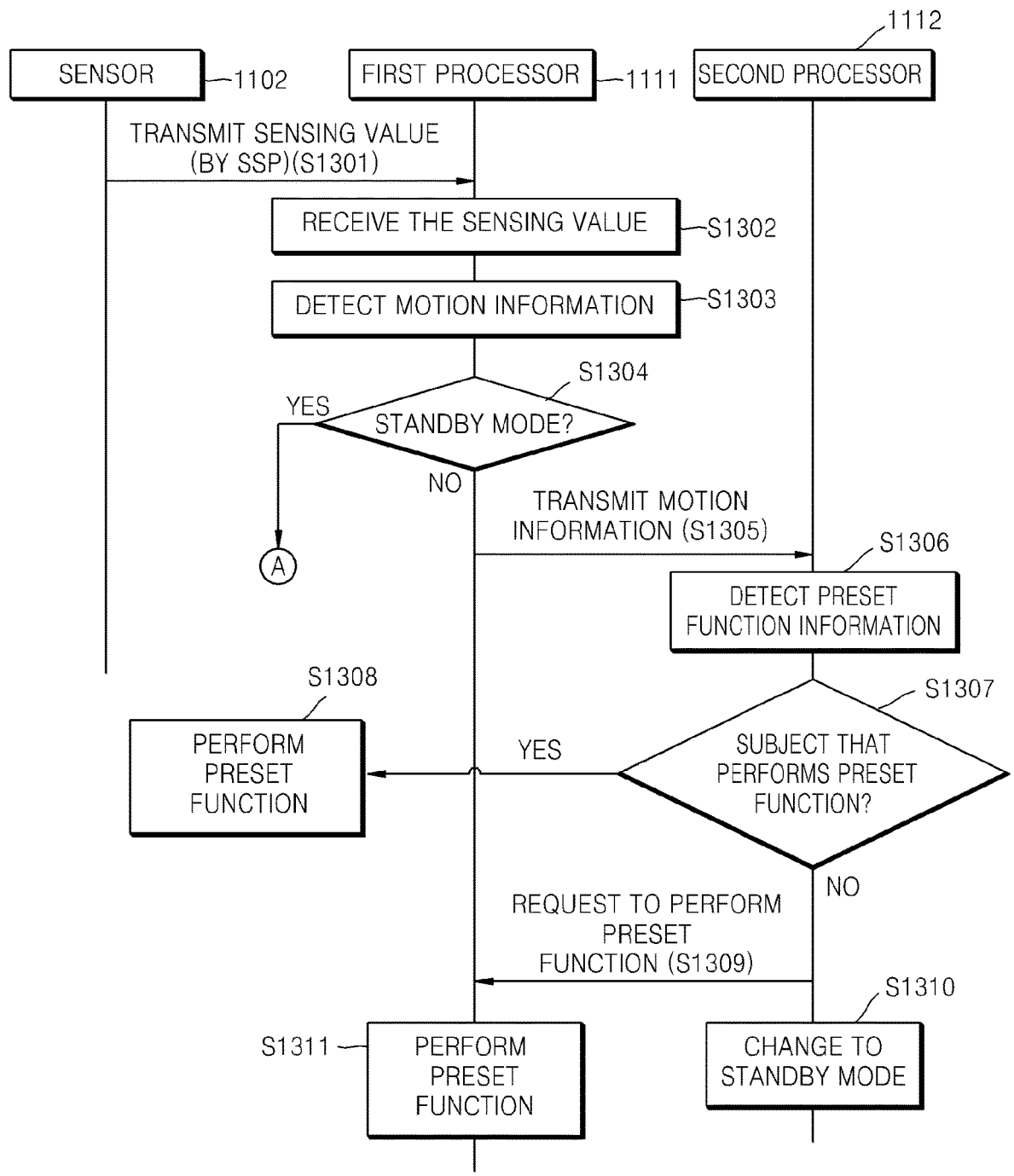
FIGS. 13A and 13B are flowcharts of a method of performing a function of a device, according to other exemplary embodiments.
Figure 13B:
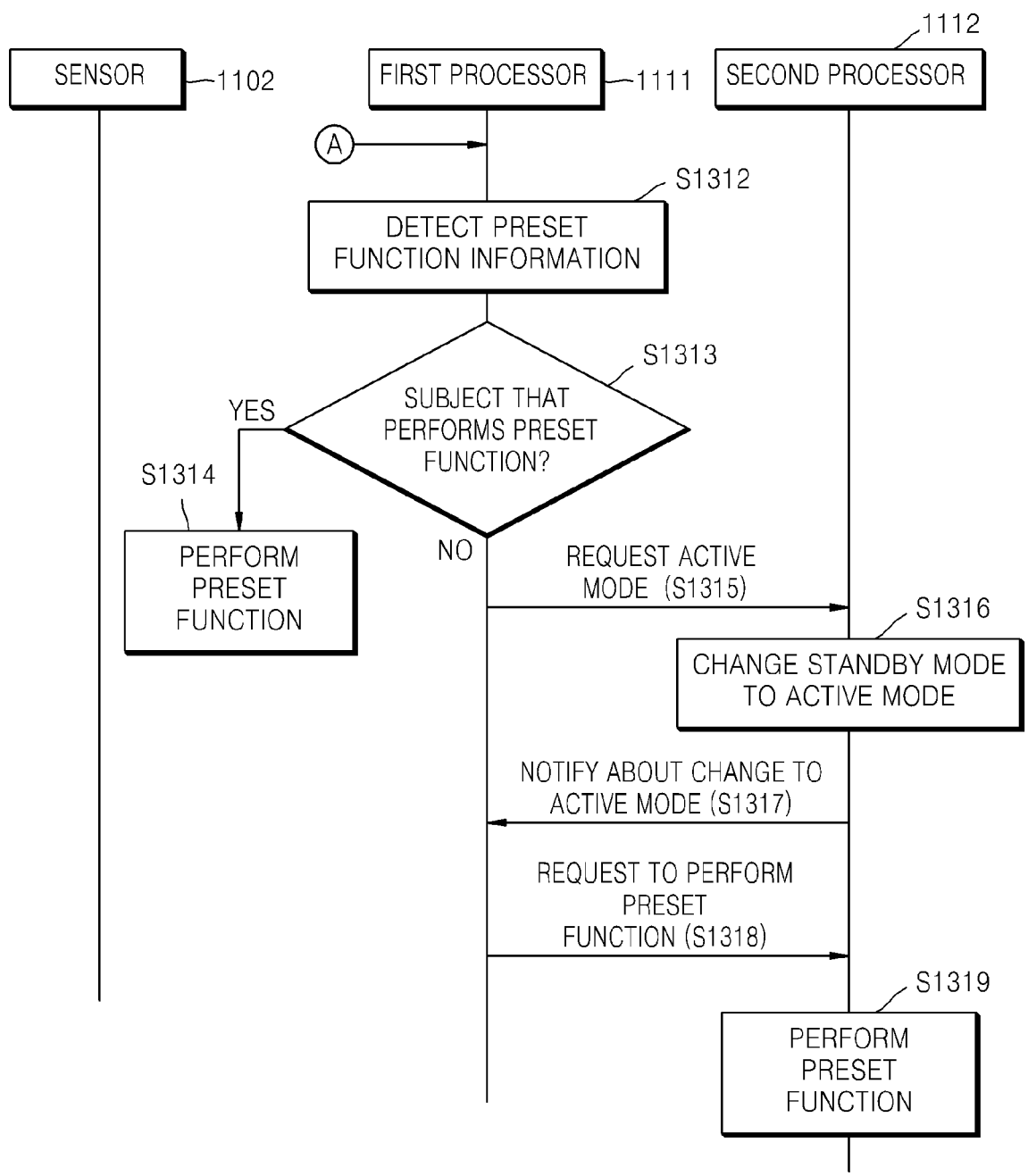

FIGS. 13A and 13B are flowcharts of a method of performing a function of the device 1100, according to other exemplary embodiments, based on relationships between the sensor 1102, the first processor 1111, and the second processor 1112 of FIG. 11. The second processor 1112 of FIGS. 13A and 13B may be referred to as the AP 1113 of FIG. 11.

In operation S1301, the sensor 1102 transmits a sensing value to the first processor 1111. In operation S1302, the first processor 1111 receives the sensing value. Operations S1301 and S1302 of FIG. 13A may be operations in which the first processor 1111 continuously receives the sensing value from the sensor 1102 in a standby mode of the device 1100.

In operation S1303, the first processor 1111 detects motion information of the device 1100 by using the received sensing value.

When the motion information of the device 1100 is detected, the first processor 1111 checks whether the operation mode of the device 1100 is in the standby mode (operation S1304). The checking of the operation mode of the device 1100 in operation S1304 may be performed by detecting information regarding the operation mode stored in a storage place such as a flag register (not shown) included in the first processor 1111 or information regarding the operation mode stored in a preset region of the storage 1107 as described with reference to FIGS. 1 and 2 above.

The information regarding the operation mode stored in the flag register and the information regarding the operation mode stored in the storage 1107 may indicate whether the device 1100 is in the standby mode or in an active mode by using, for example, a value "0" and "1". When the operation mode of the device 1100 is in the active mode, additional information indicating more detailed information regarding the operation mode of the device 1100 may be included.

The additional information may include, for example, information indicating that the device 1100 currently executes web browsing or Facebook activities. The additional information may be stored in the preset region of the storage 1107. When the operation mode of the device 1100 is in the active mode, and additional information exists, the detecting of the more detailed information regarding the operation mode of the device 1100 by using the additional information may be performed by the second processor 1112. The preset region of the storage 1107 is a region in which recorded data may be changed, and is accessible by both the first processor 1111 and the second processor 1112.

If the operation mode of the device 1100 is not in the standby mode, the second processor 112 is in the active mode. If the second processor 1112 is in the active mode and the detected preset function information is executed by the second processor 1112, the first processor 1111 transmits the detected motion information to the second processor 1112 in operation S1305.

The second processor 1112 detects the preset function information from the storage 1107 by using the received motion information in operation S1306.

The second processor 1112 may detect the more detailed information regarding the operation mode of the device 1100 by using the additional information regarding the operation mode of the device 1100 stored in the storage 1107 as described above before the preset function information is detected. The additional information may be stored in a temporal storage place included in the second processor 1112. In a case that the additional information is stored in the temporal storage place included in the second processor 1112, when the second processor 1112 receives the motion information from the first processor 1111, the second processor 1112 may detect the more detailed information regarding the operation mode of the device 1100 by using the additional information stored in the temporal storage place. The temporal storage place included in the second processor 1112 may be configured as storage medium such as RAM.

The second processor 1112 determines whether a subject that performs a preset function based on the detected preset function information is the second processor 1112 in operation S1307. The determining may be performed by using metadata for each function but is not limited thereto. For example, when a power level (or a power consumption level) necessary for performing a preset function included in metadata of a preset function is higher than a preset reference value, the second processor 1112 may determine that the subject that performs the preset function is the second processor 1112. Information regarding the preset reference value may be determined according to a level of power consumed by the device 1100 when the first processor 1111 only operates. The metadata for each function may be stored in the storage 1107.

The second processor 1112 may determine the subject that performs the preset function by using information regarding the subject that performs the preset function stored in the storage 1107. That is, the second processor 1112 may determine the subject that performs the preset function by using information (information indicating the first processor 1111 and information indicating the second processor 1112) regarding the subject mapping the preset function information stored in the storage 1107.

When it is determined that the subject that performs the preset function is the second processor 1112, the second processor 1112 performs the preset function in operation S1308.

When it is determined that the subject that performs the preset function is not the second processor 1112 but the first processor 1111, the second processor 1112 requests the first processor 1111 to perform the preset function in operation S1309 and is changed to the standby mode in operation S1310. Accordingly, the first processor 1111 performs the preset function in operation S1311. If the second processor 1112 is changed from the active mode to the standby mode, a power consumption state of the device 1100 may be changed to the above-described low power consumption state such as the standby mode of the device 1100. That is, the power consumption state of the device 1100 may be based on the sensor 1102, the first processor 1111, and the storage 1107.

If it is determined that the operation mode of the device 1100 is in the standby mode in operation S1304, the method proceeds to operation S1312.

The first processor 1111 detects the preset function information from the storage 1107 by using the detected motion information in operation S1312. When the preset function information is detected, the first processor 1111 determines that the subject that performs the preset function is the first processor 1111 according to the detected preset function information in operation S1313. The determining of the subject that performs the preset function may be performed in the same manner as described in relation to operation S1307 above. That is, if the power level necessary for performing the preset function included in the metadata included in the preset function information is lower than the preset reference value, the subject that performs the preset function may be determined as the first processor 1111.

A method of determining the subject that performs the preset function is not limited to that described above. For example, the first processor 1111 may determine the subject that performs the preset function by using the information regarding the subject mapping the preset function information stored in the storage 1107 as described above.

When the subject that performs the preset function is determined as the first processor 1111, the first processor 1111 performs the preset function while maintaining the operation mode of the device 110 in the standby mode in operation S1314.

When it is determined that the subject that performs the preset function is not the first processor 1111 in operation S1313, the first processor 1111 transmits an active mode setting request signal to the second processor 1112 in operation S1315. Accordingly, the second processor 1112 is changed from the standby mode to the active mode in operation S1316.

When the second processor 1112 is changed from the standby mode to the active mode, the second processor 1112 notifies the first processor 1111 about such a change to the active mode in operation S1317. Flag information indicating the operation mode of the device 1100 stored in the first processor 1111 or the storage 1107 is updated to indicate the active mode. The first processor 1111 transmits a preset function performing request signal to the second processor 1112 (operation S1318). The second processor 1112 performs the preset function in operation S1319.

Figure 14:
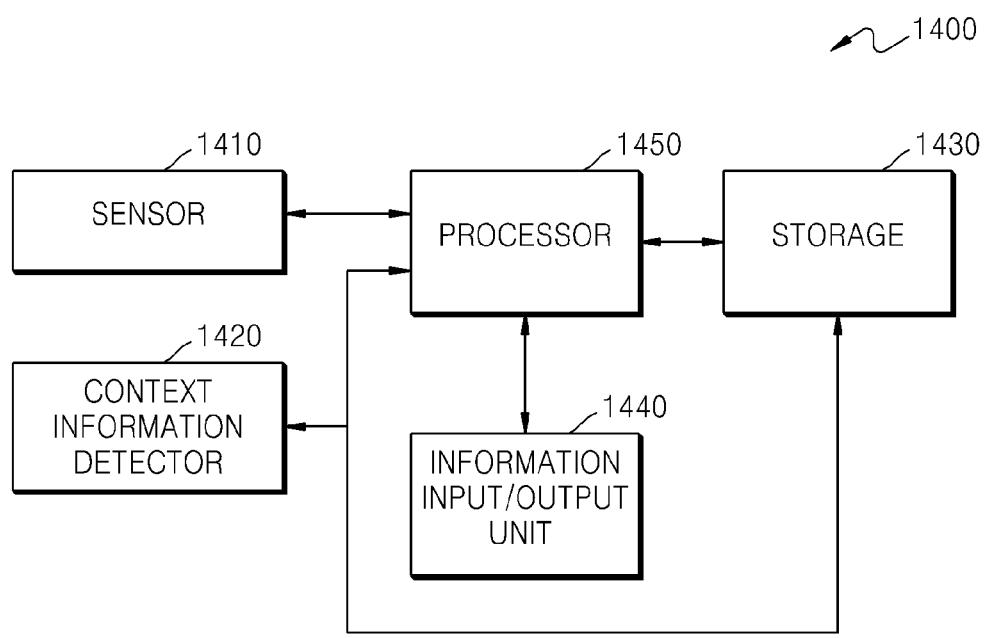
FIG. 14 is a block diagram of a device, according to another exemplary embodiment.

FIG. 14 is a block diagram of a device 1400, according to another exemplary embodiment. FIG. 14 shows an example of performing a function of the device 1400 based on information regarding a movement of the device 1400 and context information regarding the device 1400. The function of the device 1400 may be performed as displayed on at least one of the screens of FIGS. 4A through 4J.

Referring to FIG. 14, the device 1400 includes a sensor 1410, a context information detector 1420, a storage 1430, an information input/output unit 1440, and a processor 1450 but is not limited thereto. That is, the device 1400 may include more or fewer constituent elements than those shown in FIG. 14 as described with reference to FIG. 1.

For example, when the context information regarding the device 1400 is configured to be detected by using the processor 1450, the context information detector 1420 may not be included in the device 1400. When the context information such as location information of the device 1400 and time information is received from an external device, the device 1400 may include a context information receiving unit instead of the context information detector 1420. The context information receiving unit may be configured as a communicable element like the wireless communication interface 1108 of FIG. 11 but is not limited thereto. The external device may include a GPS server, but is not limited thereto.

The sensor 1410 senses the movement of the device 1400 based on the above-described SSP of FIG. 5 and transmits a sensing value to the processor 1450 like the sensor 101 of FIG. 1. The transmitted sensing value may be referred to as the information regarding the movement of the device 1400. The sensor 1410 may operate in the standby mode and the active mode of the device 1400.

The context information detector 1420 is configured to detect current time information, current location information of the device 1400, and an operation mode of the device 1400 but is not limited thereto. That is, current context information of the device 1400 may be detected by further referring to schedule information stored in the storage 1430 and log information of the device 1400.

The context information detector 1420 may also operate based on a seamless context detecting platform. When the context information detector 1420 operates based on the seamless context detecting platform, the context information detector 1420 and the processor 1450 may be connected to transmit the context information in a similar way to data communication between the sensor hub 511 and the SSP manager 512 of FIG. 5.

In this case, the context information detector 1420 may be configured to be controlled by a low power processor when the context information such as time information is detected and by an application processor when the context information other than the time information is detected. To this end, the context information detector 1420 may include independent elements according to detectable context information. For example, the context information detector 1420 may independently include an element for detecting the time information and an element for detecting the location information.

When the context information detector 1420 includes the independent elements as described above, in the standby mode of the device 1400, some elements included in the context information detector 1420 may be in an active state, and the other elements included in the context information detector 1420 may be in a deactivation state. The active state of some elements included in the context information detector 1420 may indicate a power consumption state. The deactivation state of the other elements included in the context information detector 1420 may indicate a state in which no power is consumed.

The above-described some elements included in the context information detector 1420 are controlled by the low power processor, and may include, for example, an element for detecting the context information regarding the time information. The above-described other elements included in the context information detector 1420 are controlled by the application processor, and may include, for example, an element for detecting the location information. However, the elements included in the context information detector 1420 are not limited to those described above.

The context information that may be detected by the context information detector 1420 may be detected as described below but is not limited thereto.

That is, when the device 1400 recognizes preset motion information, the context information detector 1420 may detect whether the device 1400 is in the standby mode or the active mode. The context information detector 1420 may detect whether the device 1400 is indoors or outdoors. The detecting of whether the device 1400 is indoors or outdoors may be performed by using a triangulation method based on GPS receiving information or information received from a plurality of access points (APs).

When the device 1400 is indoors, the context information detector 1420 may detect indoor information (for example, information such as an office or a house) through communication with indoor APs. When the device 1400 is outdoors, the context information detector 1420 may detect place information (for example, information such as A train station or B theater) from the GPS receiving information or the information received from the APs.

The context information detector 1420 may detect GPS based time information or current time information by using a system clock signal included in the device 1400.

The context information detector 1420 may detect related schedule information and/or related log information from schedule information and/or log information stored in the storage 1430 by using the detected time information and the location information of the device 1400. The context information detector 1420 may infer the context information by using the detected schedule information and/or log information.

When the preset motion information of the device 1400 is recognized, the context information detector 1420 may detect context information indicating that a user of the device 1400 is walking or running and then stops walking or running, and at this time, the device 1400 is in the standby mode. To detect the context information, the context information detector 1420 may include a function of using information stored in the storage 1430 and/or information stored in the processor 1450 and a function of detecting a moving speed of the device 1400. To perform the function of detecting the moving speed of the device 1400, the context information detector 1420 may be configured to previously store reference speed information necessary for detecting the moving speed of the device 1400 or to use reference speed information stored in the storage 1430.

When the preset motion information of the device 1400 is recognized, the context information detector 1420 may detect context information indicating that the user of the device 1400 holds the device 1400 in the B theater, the device 1400 is in the standby mode, and there is reservation information at a time close to a current time at the B theater by checking at least one of the schedule information, the time information, and the log information that are stored in the storage 1430 and/or the processor 1450. To this end, the context information detector 1420 may include the function of detecting the moving speed of the device 1400 as described above, a function of reading necessary information from the storage 1430 and/or the processor 1450, and a function of obtaining the location information of the device 1400 and the time information.

When the preset motion information of the device 1400 is recognized, the context information detector 1420 may detect context information indicating that the user of the device 1400 holds the device 1400 in the A train station, that the device 1400 is in the standby mode, and that a train ticket for departing from the A train station is reserved by checking at least one of the schedule information, the time information, and the log information that are stored in the storage 1430 and/or the processor 1450. To this end, the context information detector 1420 may include the function of detecting the moving speed of the device 1400, the function of reading necessary information from the storage 1430 and/or the processor 1450, and the function of obtaining the location information of the device 1400 and the time information as described above.

When the preset motion information of the device 1400 is recognized, the context information detector 1420 may detect context information indicating that the user of the device 1400 holds the device 1400, that the device 1400 is in the active mode, and that the device 1400 executes web browsing. To this end, the context information detector 1420 may include the function of detecting the moving speed of the device 1400 and the function of reading necessary information from the storage 1430 and/or the processor 1450.

When the preset motion information of the device 1400 is recognized, the context information detector 1420 may detect context information indicating that the user of the device 1400 holds the device 1400 at exit 7 at Gangnam Subway Station, that the device 1400 is in the standby mode, and that the user has an appointment at a time close to a current time. To this end, the context information detector 1420 may include the function of obtaining the location information of the device 1400 and the time information, the function of reading necessary information (for example, the schedule information) from the storage 1430 and/or the processor 1450.

The context information detector 1420 may be configured to detect only the time information and the location information as the context information. In this case, the processor 1450 may detect in more detail the current context information of the device 1400 by referring to information regarding the operation mode of the device 1400, the schedule information, and the log information that are stored in the storage 1430 based on the received time information and location information.

The storage 1430 may be configured like the storage 102 of FIG. 1 and may store information and programs. The information input/output unit 1440 may be configured like the information input/output unit 104 of FIG. 1.

When the processor 1450 operates as the low power processor (or an auxiliary processor) like the processor 103 of FIG. 1, the standby mode of the device 1400 may include the power consumption state or the active state of the sensor 1410, some or all elements included in the context information detector 1420, the storage 1430, and the processor 1450 that are included in the device 1400.

When the processor 1450 operates as the low power processor, the standby mode of the device 1400 may include a state in which no power is consumed by elements included in the device 1400, other than the sensor 1410, some or all elements included in the context information detector 1420, the storage 1430, and the processor 1450 that are included in the device 1400.

When the processor 1450 operates as the low power processor, the standby mode of the device 1400 may include at least one of a touch sensing function and a display function of a touch screen included in the information input/output unit 1440, and a screen lock setting state of the device 1400. The touch sensing function and the display function of the touch screen are as described with reference to the touch screen of FIG. 1.

The processor 1450 may include the low power processor and the application processor as described with reference to FIG. 1. When the processor 1450 includes application processor, the standby mode of the device 1400 may include the active state of the low power processor included in the processor 1450 and a deactivation state of the application processor included in the processor 1450. When the processor 1450 includes the application processor, the standby mode of the device 1400 may include a power consumption state of the low power processor included in the processor 1450. The standby mode of the device 1400 may include a state in which no power is consumed by the application processor included in the processor 1450.

When the processor 1450 includes the low power processor and the application processor, the processor 1450 may operate as shown in flowcharts of FIGS. 15, 16A, 16B, 19A, and 19B. An operation of the processor 1450 will now be described based on the flowcharts of FIGS. 15, 16A, 16B, 19A, and 19B.

Figure 15:
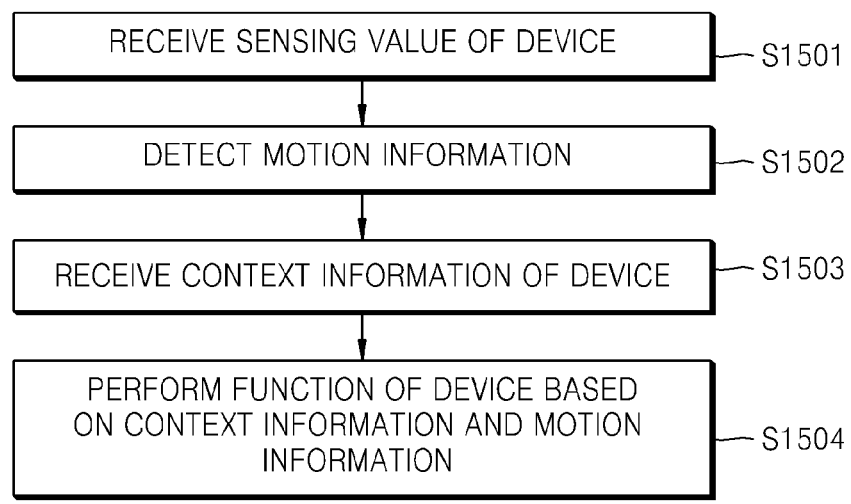
FIG. 15 is a flowchart of a method of performing a function of a device, according to another exemplary embodiment.

FIG. 15 is a flowchart of a method of performing a function of the device 1400, according to another exemplary embodiment. Referring to FIG. 15, in operation S1501, the processor 1450 receives a sensing value from the sensor 1410. The receiving of the sensing value from the sensor 1410 may be based on an SSP as described with reference to FIG. 5.

The processor 1450 detects preset motion information from the storage 1430 based on the received sensing value in operation S1502. An error range of the received sensing value may be considered with respect to the preset motion information stored in the storage 1430. For example, when the preset motion information indicates a 180° rotation, the received sensing value may be expressed as an electrical signal corresponding to 180°±α. In this case, a may be an integer greater than 0.

When preset motion information is detected, the processor 1450 receives context information from the context information detector 1420 in operation S1503. The receiving of the context information from the context information detector 1420 may be performed by transmitting a context information request signal from the processor 1450 to the context information detector 1420.

The processor 1450 performs a function of the device 1400 based on the received context information and the preset motion information of the device 1400 in operation S1504.

When time information and location information are received from the context information detector 1420, the processor 1450 may detect schedule information, log information, and an operation mode of the device 1400 that are stored in the storage 1430 by using the received time information and location information and may detect current context information of the device 1400 by using the detected schedule information, the log information and the operation mode of the device 1400. In this case, operation S1503 may refer to a context information detection operation, and the context information used in operation S1504 is the current context information related to the device 1400.

The method of FIG. 15 may be performed when the device 1400 is in the standby mode or an active mode. Thus, the function performed in operation S1504 may differ according to the operation mode of the device 1400.

Figure 16A:
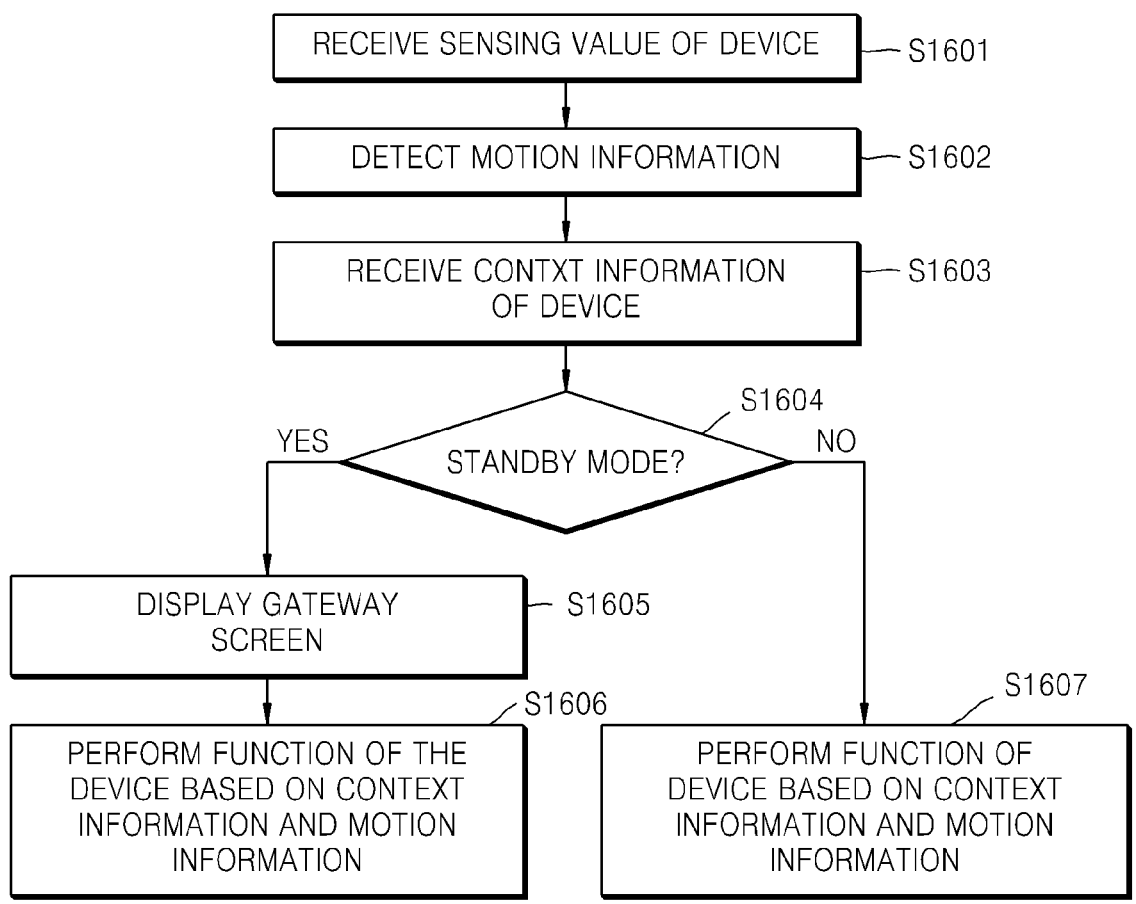
FIGS. 16A and 16B are flowcharts of a method of performing a function of a device, according to other exemplary embodiments.

FIG. 16A is a flowchart of a method of performing a function of device 1400, according to another exemplary embodiment. The flowchart of FIG. 16A further includes a function of causing the display of a gateway screen (often abbreviated to "gateway") embedded in the device 1400 when the device 1400 is in a standby mode, in addition to the flowchart of FIG. 15. When a preset function performed by the device 1400 includes a service, the gateway may be referred to as a service gateway.

The processor 1450 receives a sensing value from the sensor 1410 in operation S1601. The received sensing value may be referred to as information regarding a movement of the device 1400. The processor 1450 detects preset motion information of the device 1400 by using the received sensing value in operation S1602. When context information is received from the context information detector 1420 in operation S1603, the processor 1450 checks the operation mode of the device 1400. If the device 1400 is in the standby mode in operation S1604, the processor 1450 reads display information in respect of the gateway from the storage 1430 and controls to display a gateway screen on the information input/output unit 1440 in operation S1605. The processor 1450 detects preset function information based on the preset motion information and the context information and performs the preset function based on the detected preset function information in operation S1606.

If the device 1400 is not in the standby mode in operation S1604, the processor 1450 does not control to display the gateway screen on the information input/output unit 1440, detects the preset function information based on the context information and the motion information of the device 1400, and performs the preset function based on the detected preset function information in operation S1607.

Figure 16B:
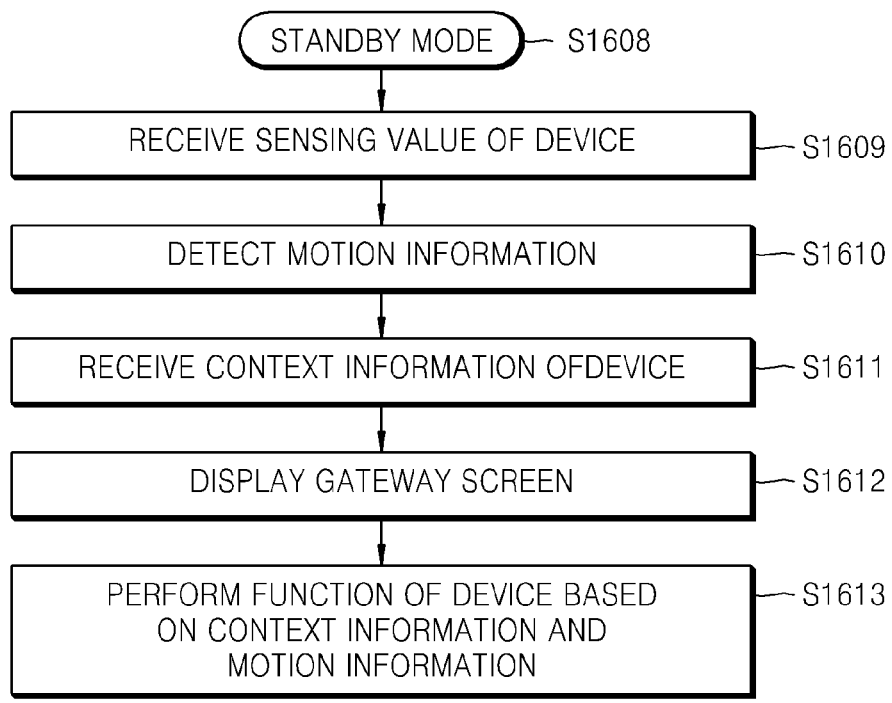

FIG. 16B is a flowchart of a method of performing a function of device 1400, according to another exemplary embodiment, when the device 1400 is in a standby mode as shown in FIG. 6B.

Referring to FIG. 16B, when the device 1400 is in the standby mode in operation S1608, the processor 1450 receives a sensing value from the sensor 1410 in operation S1609. The received sensing value may be referred to as information regarding a movement of the device 1400.

The processor 1450 detects preset motion information of the device 1400 by using the received sensing value in operation S1610. When context information is received from the context information detector 1420 in operation S1611, the processor 1450 displays a gateway screen embedded in the device 1400 by using the received context information and the detected motion information in operation S1612. The processor 1450 detects preset function information based on the preset motion information and the context information and performs a preset function based on the detected preset function information in operation S1613.

Figure 17:
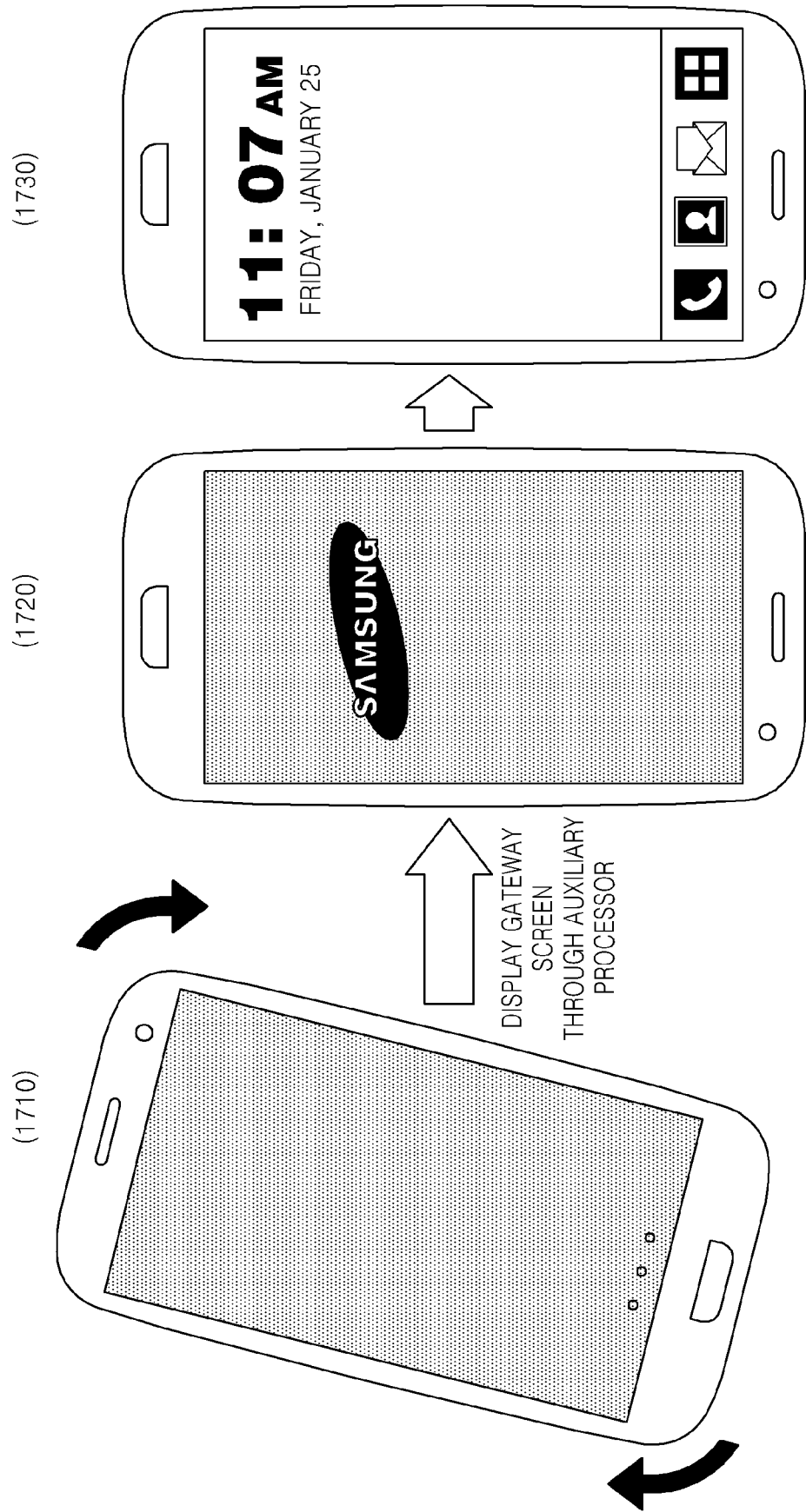
FIG. 17 shows screens for explaining functions of a device performed by using the method of FIG. 16A, according to an exemplary embodiment.

FIG. 17 shows screens 1710 through 1730 for explaining a gateway screen embedded in the device 1400 when preset motion information of the device 1400 is detected and an operation mode of the device 1400 is a standby mode.

That is, when the device 1400 is in the standby mode and a black screen state like the screen 1710, if a movement of the device 1400 that rotates by 90° in a clockwise direction is detected, the device 1400 displays the gateway screen like the screen 1720. The gateway screen may be displayed for a very short period of time. For example, the gateway screen may be displayed for about 5 seconds but is not limited thereto. A time taken to display the gateway screen may be set when an environment of the device 1400 is set.

As shown in FIG. 17, the gateway screen may be displayed by an auxiliary processor when the processor 1450 includes the auxiliary processor (for example, a low power processor) and a main processor (for example, an application processor). Thus, when a preset function that needs to be performed is performed by the auxiliary processor, and the main processor is in the standby mode, the device 1400 may perform the preset function by using the auxiliary processor while maintaining the standby mode of the main processor as shown in the screen 1730.

The gateway screen may be provided in various forms as shown in FIGS. 18A through 18F.

Figure 18A:
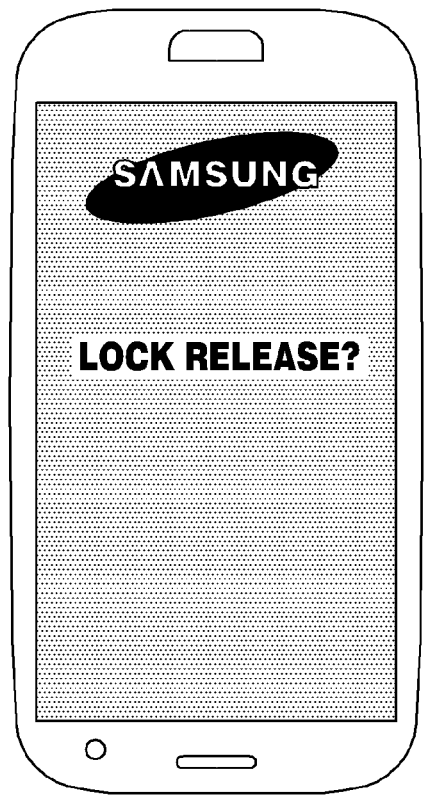
FIGS. 18A through 18F show gateway screens, according to exemplary embodiments.

That is, the gateway screen may include a language command inquiring a user about manufacturer identification information (for example, logo) of the device 1400 and a lock release as shown in FIG. 18A.

Figure 18B:
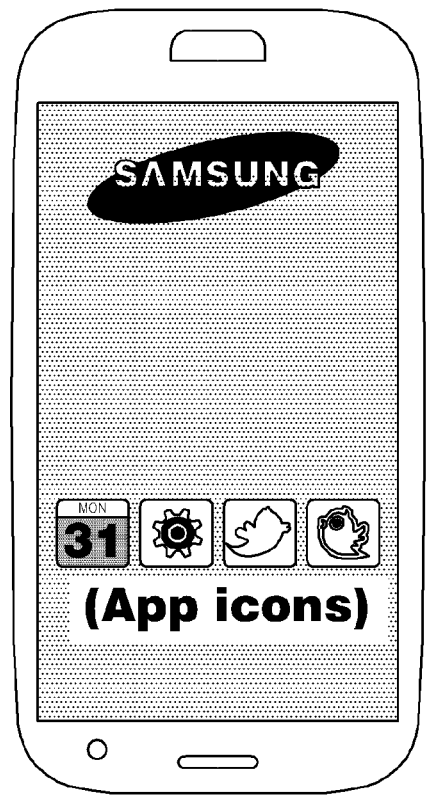

The gateway screen may include manufacturer identification information of the device 1400 and information used to select a preset executable application as shown in FIG. 18B. FIG. 18B shows the information used to select the preset executable application as icons. However, the information used to select the preset executable application is not limited to the above-described icons. For example, the information used to select the preset executable application may be provided in a text form.

When four icons are provided as shown in FIG. 18B, four applications correspond to information regarding preset functions that may be performed according to motion information of the device 1400 and context information. Thus, a user may select at least one of the four executable applications by using the four icons.

Figure 18C:
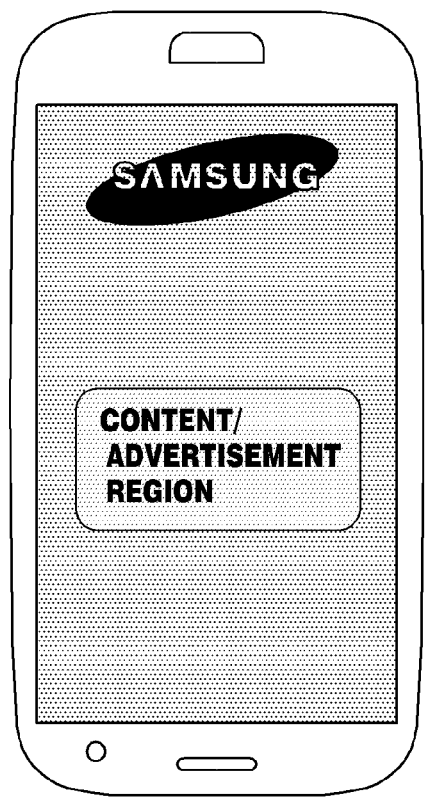

The gateway screen may include manufacturer identification information of the device 1400 and information used to allow a user to select whether to perform a preset function as shown in FIG. 18C. FIG. 18C shows a case where the information used to allow the user to select whether to perform the preset function is provided in an image form in a content/advertisement region.

Information displayed through the content/advertisement region may be a size-reduced image or a part of an image (for example, a thumbnail image or a key image or a representative image) indicating the preset function that may be performed but is not limited thereto. The user may select to perform the preset function based on a touch on the content/advertisement region. That is, the user may request to perform the preset function by touching the content/advertisement region. The information displayed through the content/advertisement region may correspond to preset function information determined according to motion information and context information of the device 1400 and may be previously stored in the storage 1430.

Figure 18D:
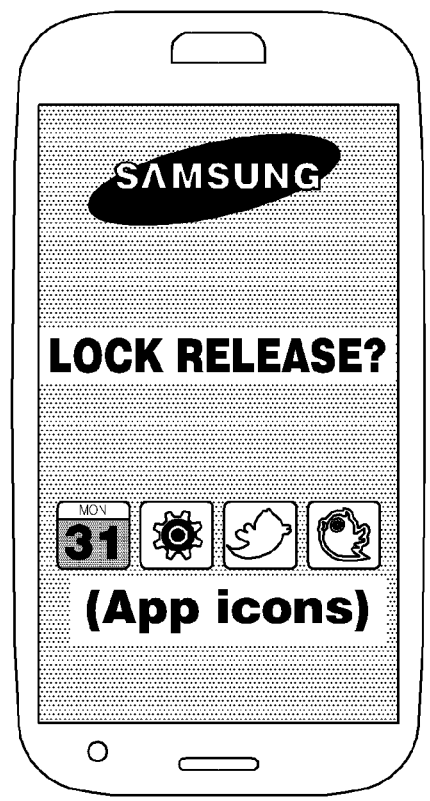
Figure 18E:
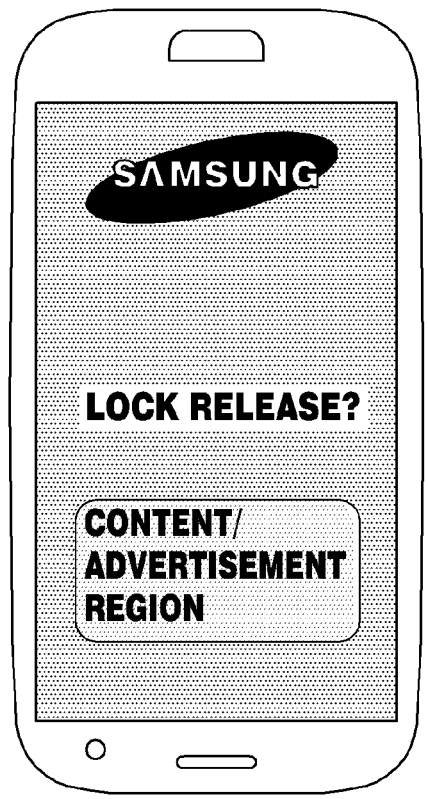

The gateway screen of FIG. 18D includes manufacturer identification information of the device 1400, a lock (or a screen lock setting state) release message, and icons used to select at least one executable application. The gateway screen of FIG. 18E includes manufacturer identification information of the device 1400, a lock release message, and information based on a content/advertisement region that is information used to allow the user to select whether to perform a preset function. The gateway screen of FIG. 18F includes manufacturer identification information of the device 1400, a lock release message, the information (the content/advertisement region) that may be selected by the user as to whether to perform a preset function, and the information (icons) used to select at least one executable application.

The gateway screens are not limited to those shown in FIGS. 18A through 18F. For example, the gateway screens may not include a message "lock release" shown in FIGS. 18A, 18D, 18E, and 18F.

The gateway screens of FIGS. 18A through 18F may be used with respect to the device 100 of FIG. 1 or the device 1100 of FIG. 11. In this case, the gateway screens of FIGS. 18A through 18F may be provided according to an operation mode of a device and motion information of the device without taking into consideration context information as described above.

Figure 19A:
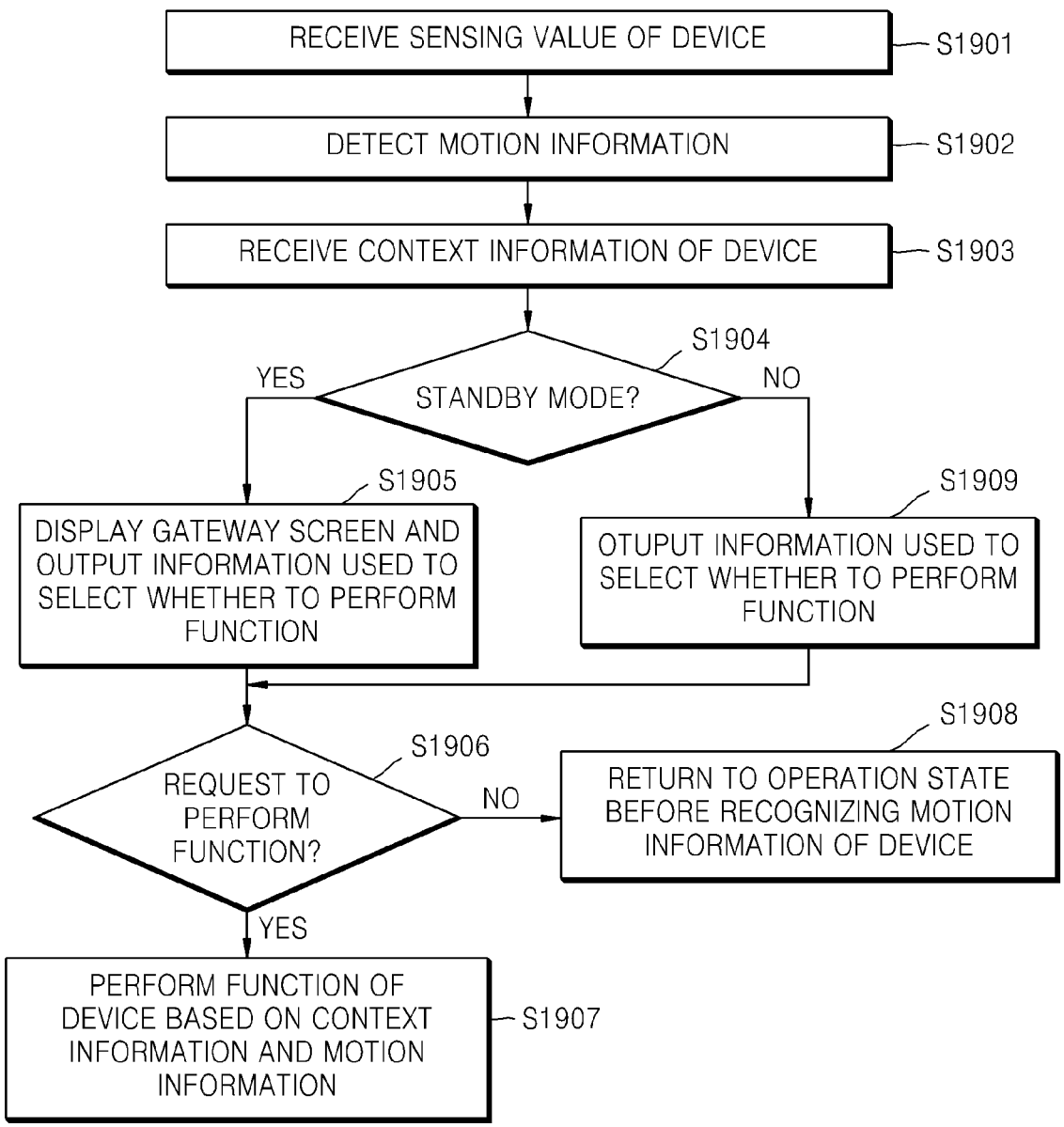
FIGS. 19A and 19B are flowcharts of a method of performing a function of a device, according to other exemplary embodiments.

FIG. 19A is a flowchart of a method of performing a function of the device 1400, according to another exemplary embodiment. The flowchart of FIG. 19A further includes a function of selecting whether to perform a function through a gateway screen, in addition to the flowchart of FIG. 16A. Thus, operations S1901 through S1904 of FIG. 19A are respectively the same as operations S1601 through S1604, and thus further descriptions thereof are omitted.

If the device 1400 is in a standby mode in operation S1904, the processor 1450 reads information regarding a gateway screen embedded in the storage 1403 and displays the gateway screen based on the information read from the storage 1403 in operation S1905. The displayed gateway screen may correspond to one of the screens of FIGS. 18B through 18F.

Thus, manufacturer identification information and information used to select whether to perform a function are output through the information input/output unit 1440. In particular, when there are a plurality of preset functions that may be performed, a plurality of pieces of information that may be selected as to whether to perform preset functions may be displayed like one of the screens of FIGS. 18B, 18D, and 18F. The information used to select whether to perform the function corresponds to preset function information determined based on preset motion information of the device 1400, detected context information, and information regarding the operation mode of the device 1400.

In operation S1906, if a request to perform a desired preset function that is to be performed is received, the processor 1450 performs the preset function that is requested to be performed in operation S1907. However, if the request is not received in operation S1906, the processor 1450 returns to an operation state before recognizing the motion information of the device 1400.

When the device 1400 is in the standby mode, if the request is not received for a preset period of time, the processor 1450 determines that no request has been made. The processor 1450 may manage the preset period of time, and the storage 1403 may store and manage the preset period of time.

In operation S1904, if the device 1400 is not in the standby mode (if the device 1400 is an active mode), the processor 1450 may output the information used to select whether to perform the function in operation S1909. In this regard, the information may be output in a pop-up window but is not limited thereto. The information is used to select whether to perform the preset function determined according to the operation mode, the motion information, and context information of the device 1400.

If the request to perform the function is received based on the information displayed on the device 1400, the processor 1450 performs the function requested in operation S1907. If the request to perform the function is not received based on the information displayed on the device 1400, the processor 1450 returns to the operation state before recognizing the motion information of the device 1400.

When the device 1400 is in the active mode, the processor 1450 may determine that the request to perform the function is not received if another function menu is requested or selected when the information used to select whether to perform the function is displayed as described above or the request to perform the function is not received for the preset period of time as described above.

Figure 19B:
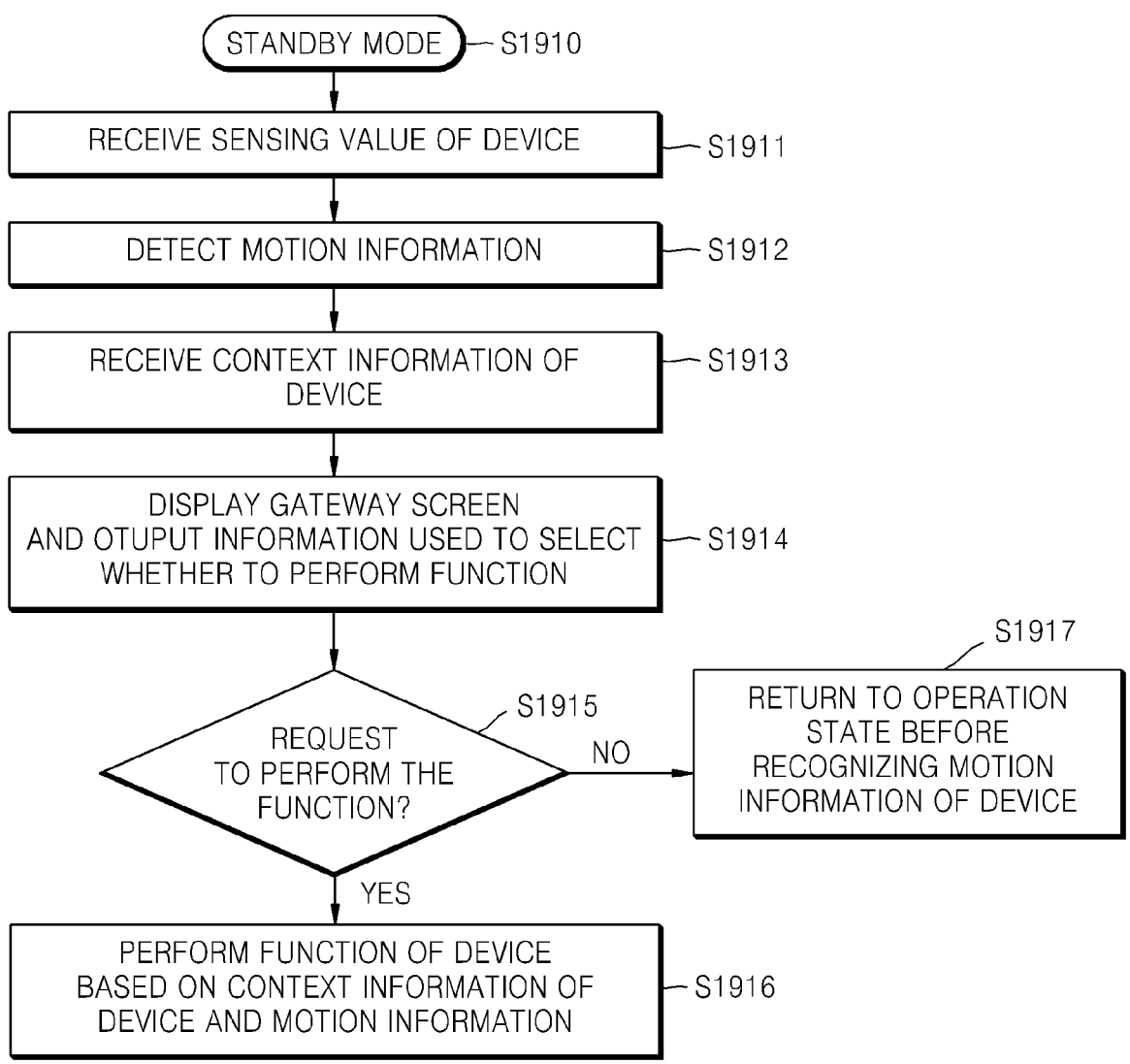

FIG. 19B is a flowchart of a method of performing a function of the device 1400, according to another exemplary embodiment when the device 1400 is in the standby mode. The flowchart of FIG. 19B further includes a function of selecting whether to perform a function through a gateway screen in addition to the flowchart of FIG. 16B. Thus, operations S1910 through S1913 of FIG. 19B are respectively performed in a similar way to operations S1608 through S1611 of FIG. 16B, and operations S1914 through 1917 of FIG. 19B are respectively performed in a similar way to operations S1905 through S1908 of FIG. 19A.

Figure 18F:
Figure 20:
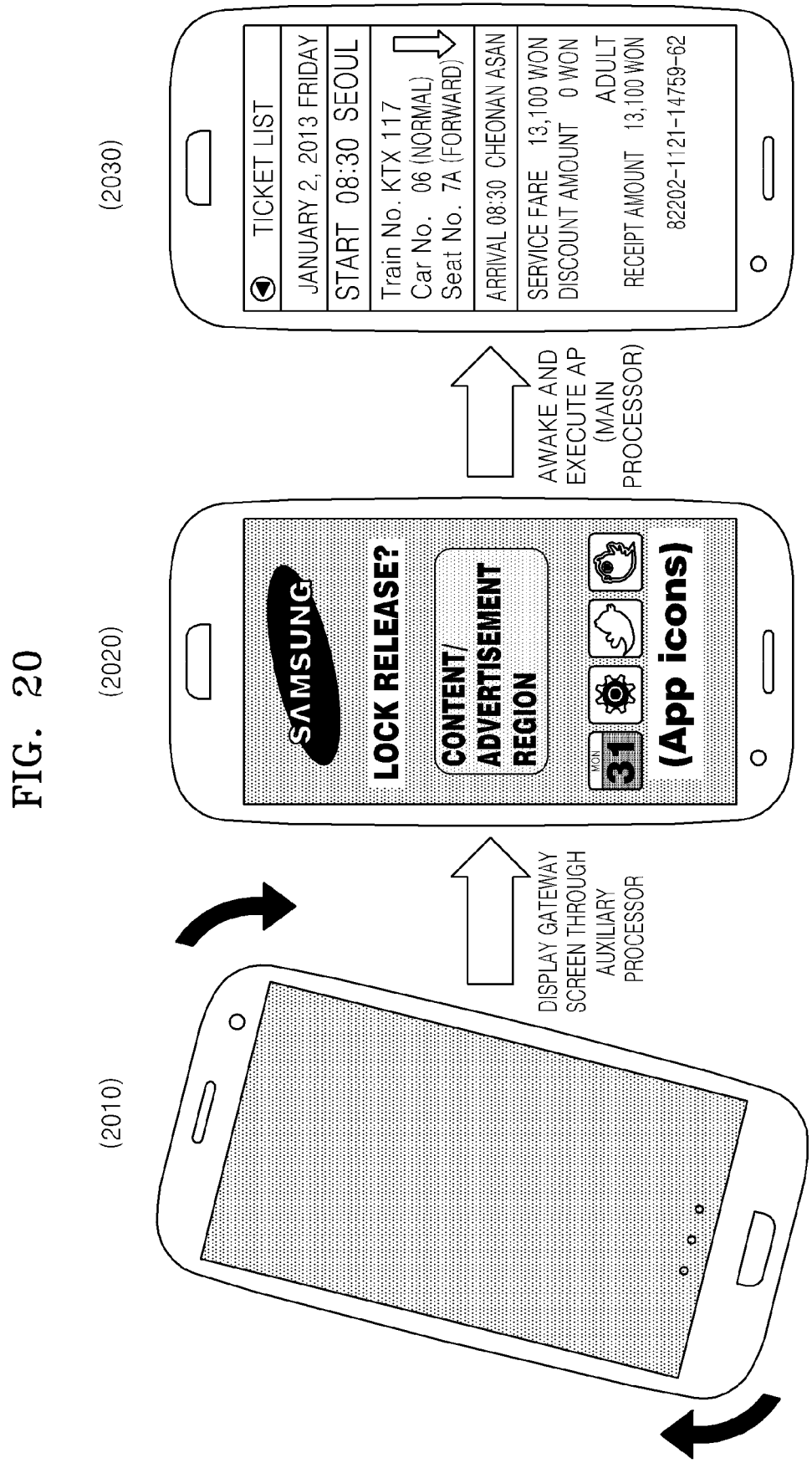
FIG. 20 shows screens for explaining functions of a device performed by using the method of FIGS. 19A and 19B, according to an exemplary embodiment.

FIG. 20 shows screens for requesting performing a preset function of the device 1400 by using a gateway screen 2020 including information (for example, icons) used to select at least one executable application and information (for example, a content/advertisement region) used to allow a user to select whether to perform a preset function as shown in FIG. 18F.

That is, if the device 1400 is in a standby mode and a black screen state as shown in a screen 2010, when upside down motion information of the device 1400 and context information of the device 1400 are detected, the gateway screen 2020 is displayed based on preset function information determined based on the motion information of the device 1400 and the context information of the device 1400.

The screen 2030 including train ticket information is displayed when the content/advertisement region is selected on the gateway screen 2020. In this regard, a part of an image of a train ticket displayed on the screen 2030, an image of a reduced train ticket, or a text form may be displayed on the content/advertisement region.

Operation S1504 of FIG. 15, operations S1606 and S1607 of FIG. 16A, operation S1613 of FIG. 16B, operation S1907 of FIG. 19A, and operation S1917 of FIG. 19B may be modified to include the methods of FIGS. 7 and 9.

Figure 21:
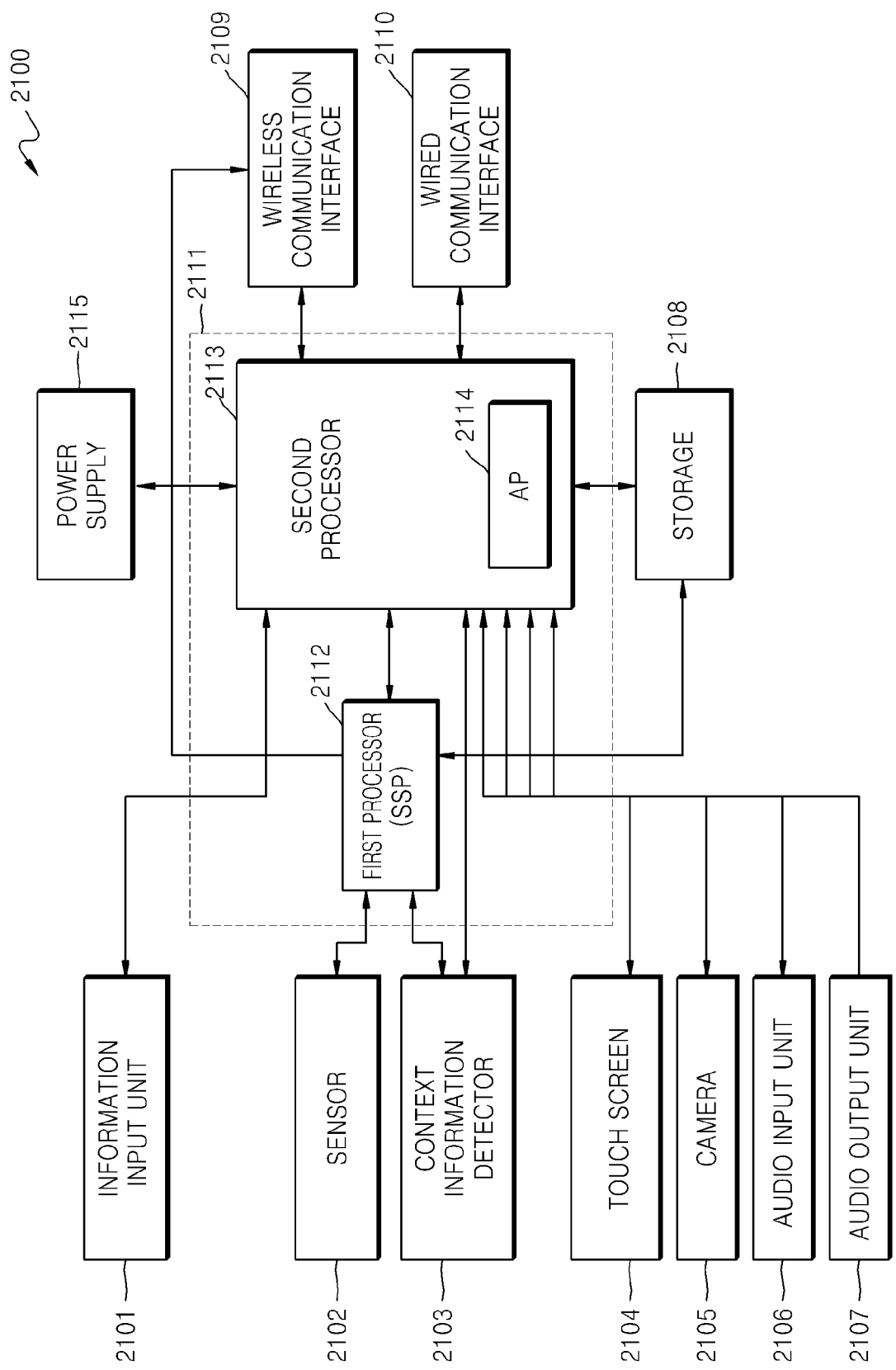
FIG. 21 is a block diagram of a device, according to another exemplary embodiment.

FIG. 21 is a block diagram of a device 2100, according to another exemplary embodiment. The device 2100 of FIG. 21 further includes a context information detector 2103 similar to the context information detector 1420 of the device 1400 of FIG. 14, in addition to the block diagram of FIG. 11. Thus, a processor 2111 may operate like the processor 1450 of FIG. 14.

The processor 2111 includes a first processor 2112 and a second processor 2113 as shown in FIG. 11. The first processor 2112 may receive a sensing value from a sensor 2102 based on the SSP of FIG. 5, and may receive context information from the context information sensor 2103 based on the seamless context detecting platform of FIG. 14.

Configurations and operations of an information input/output unit 2101, a touch screen 2104, a camera 2105, an audio input unit 2106, an audio output unit 2107, a wireless communication interface 2109, a wired communication interface 2110, and a power supply 2115 of FIG. 21 are respectively similar to those of the information input/output unit 1101, the touch screen 1103, the camera 1104, the audio input unit 1105, the audio output unit 1106, the wireless communication interface 1108, the wired communication interface 1109, and the power supply 1144 of FIG. 11.

The storage 2108 of FIG. 21 has a similar configuration to that of a combination of the storage 1430 of FIG. 14 and the storage 1107 of FIG. 11, and stores information and at least one program that are stored in the storage 1430 and the storage 1107.

A standby mode of the device 2100 may include a state as described with reference to FIGS. 1, 11, and 14. That is, the standby mode of the device 2100 may include a power consumption state of the sensor 2102, some elements of the context information sensor 2103, the first processor 2112, and the storage 2108. The standby mode of the device 2100 may include a power consumption state of the sensor 2102, the context information sensor 2103, the first processor 2112, and the storage 2108. The standby mode of the device 2100 may include a state in which no power is consumed by elements included in the device 2100 other than the sensor 2102, some elements of the context information sensor 2103, the first processor 2112, and the storage 2108. The standby mode of the device 2100 may include a state in which no power is consumed by elements included in the device 2100 other than the sensor 2102, the context information sensor 2103, the first processor 2112, and the storage 2108.

The standby mode of the device 2100 may further include at least one of an inactive state of a function related to the touch screen 2104 and a screen lock set state of the device 2100 as described with reference to FIG. 11.

The external device control methods according to exemplary embodiments may also be embodied as computer readable codes on a computer readable recording medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium may be distributed among computer systems that are interconnected through a network, and the exemplary embodiments may be stored and implemented as computer readable code in a distributed manner.

While exemplary embodiments have been particularly shown and described, it will be understood by those of ordinary skill in the art that various changes in form and details may be made herein without departing from the spirit and scope of the inventive concept as defined by the following claims.

What is claimed is:

1. An electronic device performing a function according to motion of the electronic device, the electronic device comprising:
    a first sensor;
    a display;
    a memory storing mapping information among at least one piece of motion information of the electronic device, information regarding at least one operation mode of the electronic device, and information regarding at least one function of the electronic device; and
    a processor configured to:
    obtain, through the first sensor, information regarding a motion of the electronic device being detected using the first sensor,
    based on the obtained information regarding the motion of the electronic device, identify motion information corresponding to the information regarding the motion of the electronic device, after identifying the motion information, identify an operation mode of the electronic device, in response to the identified operation mode of the electronic device being a standby mode, determine a first function to be performed by the electronic device based on the mapping information, the standby mode and the identified motion information;

after determining the first function, control the electronic device to perform the first function;

in response to the identified operation mode of the electronic device not being the standby mode, identify an application being executed on the electronic device;

after identifying the application being executed on the electronic device, determine a second function based on the mapping information, the identified application and the identified motion information; and after determining the second function, control the electronic device to perform the second function.

2. The electronic device of claim 1, wherein the mapping information comprises information regarding different functions of the electronic device based on a type of an application and a type of motion information of the electronic device.

3. The electronic device of claim 1, wherein the mapping information comprises information regarding different functions of the electronic device according to a type of an application with respect to the same motion information.

4. The electronic device of claim 1, wherein the standby mode comprises an idle state of the electronic device.

5. The electronic device of claim 1, further comprising a second sensor for obtaining context information related to the electronic device,
wherein the mapping information further comprises context information of the electronic device,
wherein the processor determines a function of the electronic device based on the mapping information, the obtained context information of the electronic device, the identified operation mode of the electronic device, and the identified motion information.

6. The electronic device of claim 5, wherein the context information comprises at least one piece of current time information, position information of the electronic device, schedule information stored in the electronic device, and log information related to the electronic device.

7. The electronic device of claim 1, wherein the motion information of the electronic device comprises motion information corresponding to a motion of the electronic device indicating taking a call, and the information regarding the operation mode of the electronic device comprises a type of an application, the application comprising a message application and a contact application.

8. A method of performing a function of an electronic device according to motion of the electronic device, the method comprising:
receiving, via a first sensor included in the electronic device, information regarding a motion of the electronic device being obtained using the first sensor, wherein the electronic device includes a memory storing mapping information among at least one piece of motion information of the electronic device, information regarding at least one operation mode of the electronic device, and information regarding at least one function of the electronic device;
in response to receiving the information regarding the motion of the electronic device, identifying motion information corresponding to the information regarding the motion of the electronic device;

after identifying the motion information, identifying an operation mode of the electronic device;

in response to the identified operation mode of the electronic device being a standby mode, determining a first function to be performed by the electronic device based on the mapping information, the standby mode, and the identified motion information;

after determining the first function, controlling the electronic device to perform the first function;

in response to the identified operation mode of the electronic device not being the standby mode, identifying an application being executed on the electronic device;

after identifying the application being executed on the electronic device, determining a second function determined based on the mapping information, the identified application and the identified motion information; and based on the determined second function, controlling the electronic device to perform the second function.

9. The method of claim 8, wherein the mapping information comprises information regarding different functions of the electronic device based on a type of an application and a type of motion information of the electronic device.

10. The method of claim 8, wherein the mapping information comprises information regarding different functions of the electronic device according to a type of an application with respect to the same motion information.

11. The method of claim 8, wherein the standby mode comprises an idle state of the electronic device.

12. The method of claim 8, further comprising:
obtaining, via a second sensor of the electronic device, context information related to the electronic device; and
determining a function of the electronic device based on the mapping information, the obtained context information of the electronic device, the identified operation mode of the electronic device, and the identified motion information,
wherein the mapping information further comprises context information of the electronic device.

13. The method of claim 12, wherein the context information comprises at least one piece of current time information, position information of the electronic device, schedule information stored in the electronic device, and log information related to the electronic device.

14. The method of claim 8, wherein the motion information of the electronic device comprises motion information corresponding to a motion of the electronic device indicating taking a call, and the information regarding the operation mode of the electronic device comprises a type of an application, the application comprising a message application and a contact application.

15. A non-transitory computer readable recording medium having recorded thereon a program which is executable by a computer to perform a method of performing a function of an electronic device according to motion of the electronic device, the method comprising:
receiving, via a first sensor included in the electronic device, information regarding a motion of the electronic device being detected using the first sensor, wherein the electronic device includes a memory storing mapping information among at least one piece of motion information of the electronic device, information regarding at least one operation mode of the electronic device, and information regarding at least one function of the electronic device;
in response to receiving the information regarding the motion of the electronic device, identifying motion information corresponding to the information regarding the motion of the electronic device;

after identifying the motion information, identifying an operation mode of the electronic device;

in response to the identified operation mode of the electronic device being a standby mode, determining a first function to be performed by the electronic device based on the mapping information, the standby mode, and the identified motion information;

after determining the first function, controlling the electronic device to perform the first function;

in response to the identified operation mode of the electronic device not being the standby mode, identifying an application being executed on the electronic device;

after identifying the application being executed on the electronic device, determining a second function determined based on the mapping information, the identified application and the identified motion information; and based on the determined second function, controlling the electronic device to perform the second function.

* * * * *